United States Patent [19]

Mishler

[11] Patent Number: 5,283,883
[45] Date of Patent: Feb. 1, 1994

[54] METHOD AND DIRECT MEMORY ACCESS CONTROLLER FOR ASYNCHRONOUSLY READING/WRITING DATA FROM/TO A MEMORY WITH IMPROVED THROUGHPUT

[75] Inventor: Conan Mishler, Sunnyvale, Calif.

[73] Assignee: Sun Microsystems, Inc., Mountain View, Calif.

[21] Appl. No.: 778,507

[22] Filed: Oct. 17, 1991

[51] Int. Cl.⁵ .................. G06F 13/00; G06F 13/28; G06F 13/36
[52] U.S. Cl. ..................... 395/425; 364/DIG. 1; 364/239; 364/242.31; 395/250
[58] Field of Search .............. 395/425, 250, 200; 364/DIG. 1, 242.3, 242.31, 239

[56] References Cited

U.S. PATENT DOCUMENTS

| | | | |
|---|---|---|---|
| 4,910,656 | 3/1990 | Scales, III, et al. | 250/216 |
| 5,019,962 | 5/1991 | Funabashi et al. | 395/425 |
| 5,175,818 | 12/1992 | Kunimoto et al. | 395/200 |
| 5,179,663 | 1/1993 | Iimura | 395/250 |
| 5,182,800 | 1/1993 | Farrell et al. | 395/425 |

OTHER PUBLICATIONS

Computer Design, vol. 24, No. 8, Published Jul. 1985, in Littleton, Mass., USA, pp. 85-88, Author: Michael M. Tehranian, Entitled: DMA Cache Speeds Execution in Mixed-Bus Systems.
Microprocessors and Microsystems, vol. 14, No. 10, Published Dec. 1990, London GB, pp. 653-663, Entitled: Enhancing MC68030 performance using the SN74ACT2155 Cache.
IBM Technical Disclosure Bulletin, vol. 31, No. 11, Published Apr. 1989, Armonk, N.Y., U.S., pp. 324-328, Entitled: Direct Memory Access For Multiple Requesting Computer Devices.
IBM Technical Disclosure Bulletin, vol. 33, No. 1A, Published Jun. 1990, Armonk, N.Y., U.S., pp. 41-43, Entitled: Direct Memory Access Transfer Control Technique.

Primary Examiner—Alyssa H. Bowler
Attorney, Agent, or Firm—Blakely Sokoloff Taylor & Zafman

[57] ABSTRACT

Buffer lines and corresponding buffer tags and buffer valid/dirty registers in conjunction with buffer control circuit are provided to a DMA controller enabling the DMA controller to conditionally pre-fetch data from memory while data being read are transferred from the DMA controller to the I/O device during read operations, and to conditionally write data back to memory while data being written are transferred from the I/O device to the DMA controller during write operations, thereby improving asynchronous read/write throughputs. Read requests, random as well as sequential, are satisfied with pre-fetched data if they are validly stored. Write requests, random as well as sequential, are deferred, batched and optimized. The improved throughput is achieved in a manner completely transparent to system software.

20 Claims, 15 Drawing Sheets

METHOD AND DIRECT MEMORY ACCESS CONTROLLER FOR ASYNCHRONOUSLY READING/WRITING DATA FROM/TO A MEMORY WITH IMPROVED THROUGHPUT

BACKGROUND OF THE INVENTION

1. Field of the Invention

The present invention is related to the field of computer systems. More particularly, the present invention is a method and direct memory access controller for asynchronously reading/writing data from/to a memory with improved throughput.

2. Art Background

Traditionally, data transfers between memory and an input-output (I/O) device of a computer system are accomplished in one of three ways:

1. Programmed I/O. In this case, all data transfers between the memory and the I/O device is completely controlled by the central processing unit (CPU), or more precisely, by a program executed by the CPU.

2. Interrupt I/O. In this case, all data transfers between the memory and the I/O device are initiated by the I/O devices through interrupts. In response, the CPU suspends whatever it is currently doing and attends to the needs of the I/O device.

3. Direct Memory Access (DMA). In this case, all data transfers between the memory and the I/O device are accomplished without involving the CPU.

The DMA approach provides a much faster way of moving data between the memory and the I/O device. Typically, a direct memory access controller is employed. The DMA controller, the CPU, the memory and the I/O device are all coupled to a system bus. Upon request of the I/O device, the DMA controller suppresses the CPU, takes control of the system bus and causes data to be transferred between the memory and the I/O device. The DMA controller is not involved in the actual transfer of the data. By duplicating the internal logic of the DMA controller, a DMA controller may support multiple I/O devices.

Alternatively, the I/O device may be coupled to the DMA controller instead of the system bus. In that case, after taking control of the system bus, the DMA controller causes data to be transferred from the memory (I/O device) to itself and then re-transmits the data to the I/O device (memory). By involving the DMA controller in the actual data transfer, the DMA controller gains the ability to interpret or process the data being transferred. However, the DMA controller pays for the added ability by sacrificing performance.

Typically, the data are transferred on a first-in first-out (FIFO) basis. The memory (I/O device) waits while the data are being re-transmitted from the DMA controller to the I/O device (memory). While some DMA controllers allow the next data transfer from the memory (I/O device) to parallel the re-transmission of the prior data to the I/O device (memory), the next data must be sequential to the prior data.

As will be discussed, the present invention overcomes the disadvantages of the prior art, and provides a method and a DMA controller for asynchronously reading/writing data from/to a memory with improved throughput. The method and the DMA controller achieve the improved throughput in a manner that is completely transparent to the system software.

SUMMARY OF THE INVENTION

A method and direct memory access (DMA) controller for asynchronously reading/writing data from/to a memory with improved throughput is disclosed. The method and DMA controller of the present invention achieves the improved throughput in a manner that is completely transparent to the system software. The method comprises a plurality of data reading steps and a plurality of data writing steps that are performed asynchronously. The DMA controller comprises a plurality of elements cooperatively performing the asynchronous data reading/writing steps.

The data reading steps of the method of the present invention comprise receiving a first read operation from the I/O device identifying $n_1$ data bytes to be retrieved from the memory and returned to the I/O device. Upon receipt of the first read operation, a first $m_1$ data bytes comprising the $n_1$ data bytes are retrieved from the memory, stored into a first read buffer line, and marked valid. The validly stored $n_1$ data bytes are returned to the I/O device, and marked invalid. Concurrent with the returning of the validly stored $n_1$ data bytes, a decision is made whether a second $m_1$ data bytes are to be pre-fetched from the memory. The decision is made in a pre-determined manner. If the decision is to pre-fetch, a second $m_1$ data bytes are pre-fetched, stored into a second read buffer line, and marked valid.

The data reading steps further comprise receiving a second read operation from the I/O device identifying $n_2$ data bytes to be retrieved from the memory and return to the I/O device. Upon receipt of the second read operation, the first and second read buffer lines are checked to determine if the $n_2$ data bytes are validly stored in one of the two read buffer lines. The decision is made independent of whether the second read operation is sequential to the first read operation. If the $n_2$ data bytes are not validly stored in one of the two buffers, a third $m_1$ data bytes comprising the $n_2$ data bytes are retrieved from the memory, stored into a third read buffer line, and marked valid. Similarly, the validly stored $n_2$ data bytes are returned to the I/O device, and marked invalid. If there are only two read buffer lines, the third read buffer line is the least recently read of the first and second read buffer lines.

The data writing steps of the method of the present invention comprise receiving a first write operation from the I/O device identifying where $n_3$ data bytes are to be written into the memory. Upon subsequent receipt of the $n_3$ data bytes, they are stored into a first write buffer line and marked dirty. The dirty bytes in the first write buffer line are not drained into the memory until later when at least one of a plurality of draining conditions is met for the first write buffer line. Upon draining, the drained data bytes are marked as not dirty.

The data writing steps further comprise receiving a second write operation from the I/O device identifying where $n_4$ data bytes are to be written into the memory. Upon subsequent receipt of the $n_4$ data bytes, they are either merged into the first write buffer line or stored into a second write buffer line. In either case, the stored $n_4$ data bytes are marked dirty. Similarly, the dirty bytes in the second write buffer line are not drained into the memory until later when at least one of a plurality of draining conditions is met for the second write buffer line. Upon draining, the drained data bytes are marked not dirty.

The data writing steps further comprise receiving a third write operation from the I/O device identifying where $n_5$ data bytes are to be written into the memory. Upon subsequent receipt of the $n_5$ data bytes, they are either merged into the first or the second write buffer line, or stored into a third write buffer line. In any of the above cases, the stored $n_5$ data bytes are marked dirty. If there are only two write buffer lines, the third write buffer line is the least recently used of the first and second write buffer lines. The dirty bytes in the least recently used of the first and second write buffer lines are drained before the $n_5$ data bytes are stored.

The preferred embodiment of the DMA controller of the present invention comprises a buffer control circuit, a first and second buffer lines, a first and second buffer tags, a first and second buffer registers, an I/O device interface and a system bus interface. The I/O device interface receives the read and write operations from the I/O device asynchronously. The system bus interface retrieves and writes data bytes from and into the memory asynchronously. The first and second buffers store the retrieved data, including the pre-fetched data, and sends the data being read to the I/O device during read operations. Additionally, the first and second buffers store the data to be written into the memory during write operations. The first and second buffer tags contain memory addresses associated with the data bytes stored into the first and second buffer lines. The first and second buffer registers contain a plurality of valid/- dirty bits which identify whether the data bytes stored in the first and second buffers are valid/dirty during read/write operations.

The buffer control circuit controls the data reading and data writing operations asynchronously. The buffer control circuit determines whether data bytes being read are validly stored in one of the buffer lines or whether they need to be retrieved from the memory. It also determines whether data bytes are to be pre-fetched, and where the retrieved/pre-fetched data bytes are to be stored. Additionally, the buffer control circuit determines where the data bytes being written are to be stored, and when the dirty data bytes are to be drained into the memory.

BRIEF DESCRIPTION OF THE DRAWINGS

The features and advantages of the present invention will be apparent from the following detailed description of the preferred embodiment of the invention with references to the drawings in which.

DETAILED DESCRIPTION OF THE INVENTION

A method and a direct memory access (DMA) controller for asynchronously reading/writing data from/to a memory with improved throughput is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
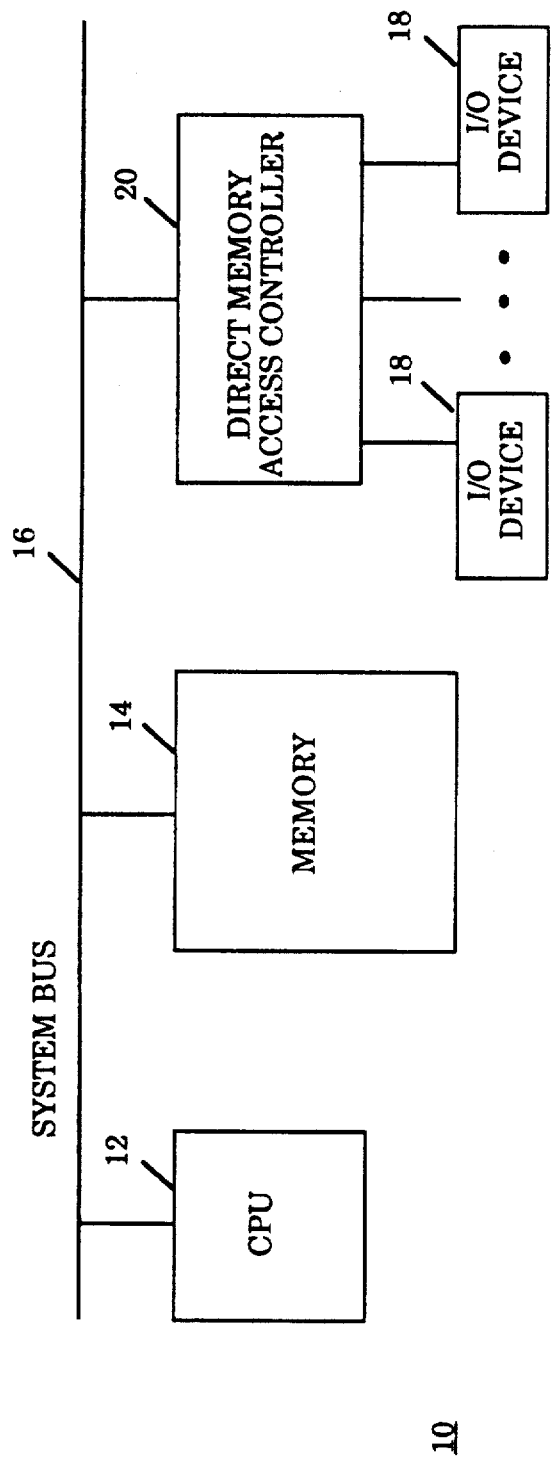
FIG. 1 shows a block diagram illustrating a system view of the direct memory access (DMA) controller of the present invention.

Referring now to FIG. 1, a block diagram illustrating a system view of the DMA controller of the present invention is shown. The DMA controller 20 of the present invention is coupled to a system bus 16 of a computer system 10, and at least one I/O device 18. The computer system 10, in addition to the DMA controller 20, the system bus 16 and the I/O devices 18, further comprises a CPU 12 coupled to the system bus 16 and a memory 14 coupled to the system bus 16. The DMA controller 20 serves one I/O device 18 at a time, and arbitrates any concurrent requests. Each I/O device 18 reads/writes data from/to the memory 14 through the DMA controller 20 asynchronously.

For read operations, data are transferred from the memory 14 to the DMA controller 20 and re-transmitted to the I/O device 18. To transfer data from the memory 14 to the DMA controller 20, the DMA controller 20 suppresses the CPU 12 and takes controls of the system bus 16. Additionally, the DMA controller 20 of the present invention conditionally pre-fetches additional data from the memory 14 in anticipation of these data being read subsequently by the I/O device 18 while data are being re-transmitted from the DMA controller 20 to the I/O device 18. The I/O device 18 initiates a read operation with a request signal, and the DMA controller 20 confirms with an acknowledgement signal.

During write operations, data are transferred from the I/O device 18 to the DMA controller 20 and re-transmitted to the memory 14. To transfer data from the DMA controller 20 to the memory 14, the DMA controller 20 suppresses the CPU 12 and takes controls of the system bus 16. However, the DMA controller 20 of the present invention defers re-transmitting the data to the memory 14 after receiving the data from the I/O device 18 until at least one of a plurality of draining conditions is met. Furthermore, the DMA controller 20 of the present invention continues to accept data for the next write from the I/O device 18 while data are being re-transmitted from the DMA controller 20 to the memory 14 until the DMA controller 20 has exhausted its capacity to accept data. The I/O device 18 initiates a write operation with a request signal, and the DMA controller 20 confirms with an acknowledgement signal.

These and other features of the DMA controller 20 of the present invention as applied to one I/O device will first be described. Then the DMA controller 20 of the present invention as applied to a first and second I/O device will be described.

Figure 2:
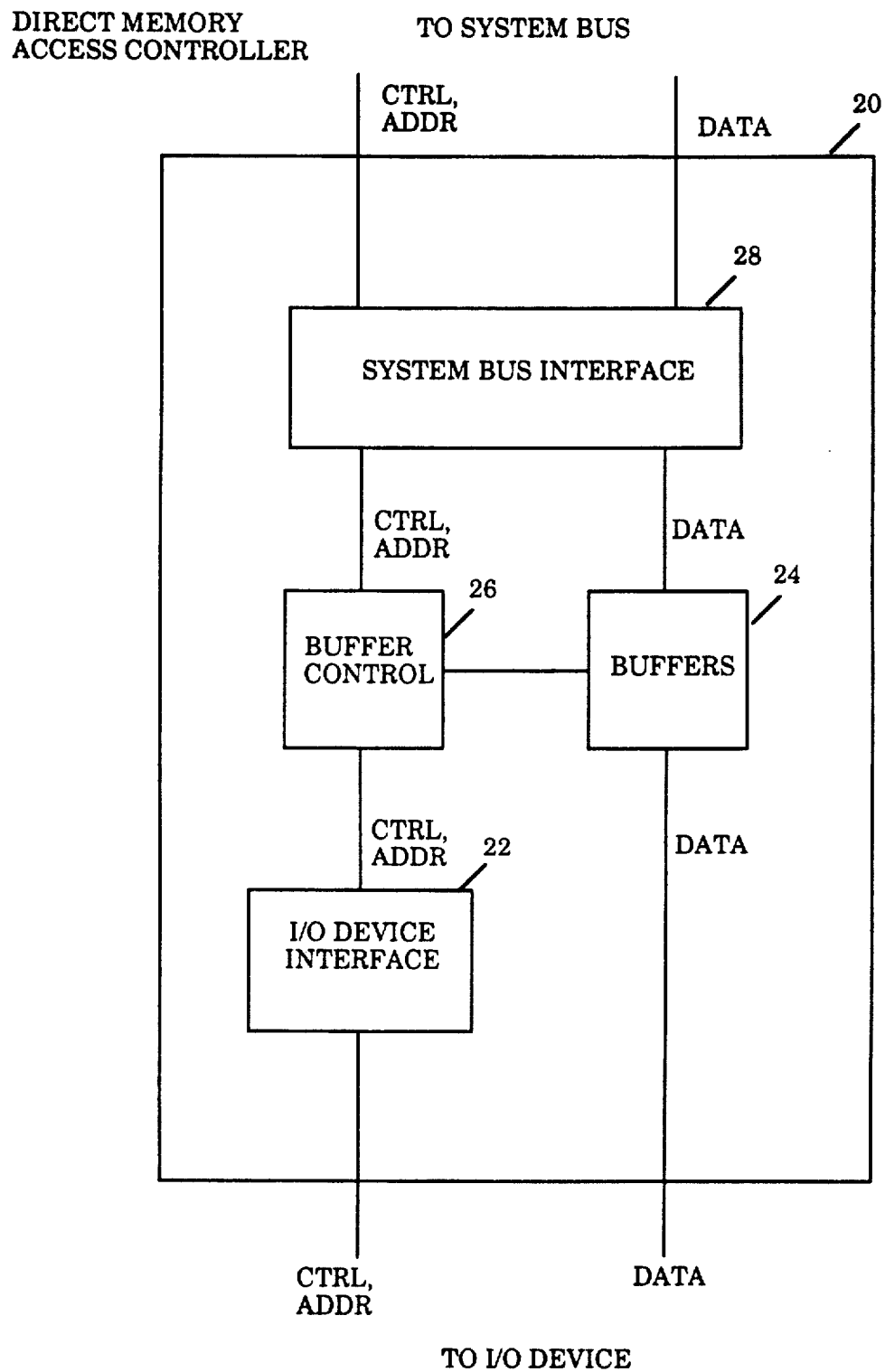
FIG. 2 shows a block diagram illustrating a component view of the preferred embodiment of the DMA controller of the present invention.

Referring now to FIG. 2, a block diagram illustrating a component view of the preferred embodiment of the DMA controller of the present invention is shown. The preferred embodiment of the DMA controller of the present invention 20 comprises an I/O device interface 22, a plurality of buffers 24, a buffer control circuit 26 and a system bus interface 28. The I/O device interface 22 and the buffers 24 are coupled to an I/O device (not shown). The system bus interface 28 is coupled to the buffers 24 and a system bus (not shown) which in turns is coupled to a memory (not shown). The buffer control circuit 26 is coupled to the I/O device interface 22, the buffers 24, and the system bus interface 26. These elements cooperatively perform the asynchronous data reading/writing steps of the method of the present invention.

Continuing referring to FIG. 2, in the preferred embodiment of the present invention, the I/O device interface 22 interfaces with the I/O device performing the asynchronous reads/writes from/to the memory. During read and write operations, the I/O device interface 22 receives and transfers read and write control signals and memory addresses (CTRL & ADDR) from and to the I/O device. Optionally, the I/O device interface 22 may provide protocol transformation for the read and write control signals and memory addresses (CTRL, ADDR).

During a read operation, the I/O device interface 22 receives a plurality of read control and memory address inputs (CTRL & ADDR) from the I/O device. The plurality of read control and address inputs (CTRL & ADDR) comprise a read signal, a read size and a read address. The read size and read address pair received identifies where in the memory a plurality of data bytes are to be retrieved and returned to the I/O device for the particular read operation. In response, the I/O device interface 22 forwards the read signal, read size and read address received to the buffer control circuit 26. When the data bytes for the particular read operation are ready for return to the I/O device, the I/O device interface 22 receives a read data ready signal from the buffer control circuit 26. In response, the I/O device interfaces 24 forwards the read data ready signal to the I/O device.

Similarly, during a write operation, the I/O device interface 22 receives a plurality of write control signal and memory address inputs (CTRL & ADDR) from the I/O device. The plurality of write control and memory address inputs comprise a write signal, a write size and a write address. The write size and write address pair received identifies where in the memory a plurality of data bytes to be subsequently provided by the I/O device are to be written. In response, the I/O device interface 22 forwards the write signal, write size and write address received to the buffer control circuit 26. When the buffers are ready to receive the data bytes for the particular write operation, the I/O device interface 22 receives a write buffer ready signal from the buffer control circuit 26. In response, the I/O device interfaces 24 forwards the write buffer ready signal to the I/O device.

Continuing referring to FIG. 2, in the preferred embodiment of the present invention, the system bus interface 28 interfaces with the system bus for asynchronously reading data from the memory and writing data into the memory. During read and write operations, the system bus interface 28 gains control of the system bus, receives and transfers read and write control signals and memory addresses (CTRL & ADDR) and data bytes (DATA) from and to the system bus. Optionally, the system bus interface 28 may provide protocol transformation for the read and write control signals and memory addresses (CTRL, ADDR).

During a read operation, the system bus interface 28 conditionally receives a plurality of read control and memory address inputs (CTRL & ADDR) from the buffer control circuit 26. The plurality of read control and address inputs (CTRL & ADDR) comprise a read signal, read size and read address. The read size and read address identify where in the memory a fixed number of data bytes are to be retrieved. The fixed number of data bytes are either being retrieved for the current read operation initiated by the I/O device or being pre-fetched in anticipation of a subsequent read operation to be initiated by the I/O device. In response, the system bus interface 28 gains control of the system bus, forwards the read signal received, and the read size and read address to the system bus, which in turns forwards them to the memory. Upon return of the retrieved/pre-fetched data bytes, the system bus interface 28 stores the retrieved/pre-fetched data bytes into one of the buffers 24 selected by the buffer control circuit 26. The fixed number of data bytes are retrieved/pre-fetched from the memory in a single burst.

Additionally, if the fixed number of data bytes are retrieved for the current read operation, the plurality of read control and address inputs (CTRL & ADDR) are provided by the buffer control circuit 26 to the system bus interface 28 in a manner, such that when the system bus interface 28 forwards them to the system bus and in turns to the memory, the data bytes being read by the current read operation are returned first, i.e., out of order fetch.

Similarly, during a write operation, the system bus interface 28 conditionally receives a plurality of write control signal and memory address inputs (CTRL & ADDR) from the buffer control circuit 26. The plurality of write control and memory address inputs (CTRL & ADDR) comprise a write signal, a write size and a write address. The write size and write address pair received identifies where in the memory a plurality of data bytes to be drained from one of the buffers 24 are to be written. The data bytes are either all or part of the data bytes to be drained from the draining buffer. The data bytes are being drained from the draining buffer and written into the memory for one of the current or prior write operations. In response, the system bus interface 28 gains control of the system bus, drains the data bytes from the draining buffer selected by the buffer control circuit 26, and forwards the write signal, write size, write address and the data bytes being drained to the system bus, which in turns forwards them to the memory.

The system bus interface 28 is implemented in a manner such that the fixed number of data bytes retrieved for the current read operation or pre-fetched in anticipation of a subsequent read operation are sufficiently large to support a plurality of successive read operations by the I/O device. The system bus interface is also implemented in a manner such that the system bus interface may be coupled to different system buses having different burst sizes. The burst size of the system is specified via a plurality of burst size bits in an internal register (not shown). The burst size bit settings comprise a setting of "00" denoting that sixteen data bytes are to be retrieved/pre-fetched from the memory each burst, and a setting of "01" denoting that thirty-two data bytes are to be retrieved/pre-fetched from the memory each burst.

Additionally, the system bus interface 28 is implemented in a manner such that the burst sizes for draining data bytes from the buffers 24 and writing them into the memory optimized by the buffer control circuit 26. The burst sizes for draining data bytes are optimized according to the burst size bit settings discussed above. The setting of "00" denotes that a buffer is to be drained in burst sizes of one byte, two bytes, four bytes, or sixteen bytes, and the setting of "01" denotes that a buffer is to be drained in burst sizes of one byte, two bytes, four bytes, sixteen bytes or thirty-two bytes.

For example, for an exemplary network controller that either reads/writes a two byte device descriptor or eight successive pairs of two bytes data, and a system bus having a burst size of sixteen bytes, the plurality of burst size bits in the internal register are set to "00", such that the system bus interface 28 will retrieve/pre-fetch sixteen bytes from the memory each burst, and the buffer control circuit 26 optimizes the system bus interface 28 to drain a buffer with a burst size of two bytes or a burst size of sixteen bytes. Thus, one retrieval/pre-fetch will support all eight successive reads without further access to the memory and all eight successive writes may be written into the memory in one burst.

Figure 3:
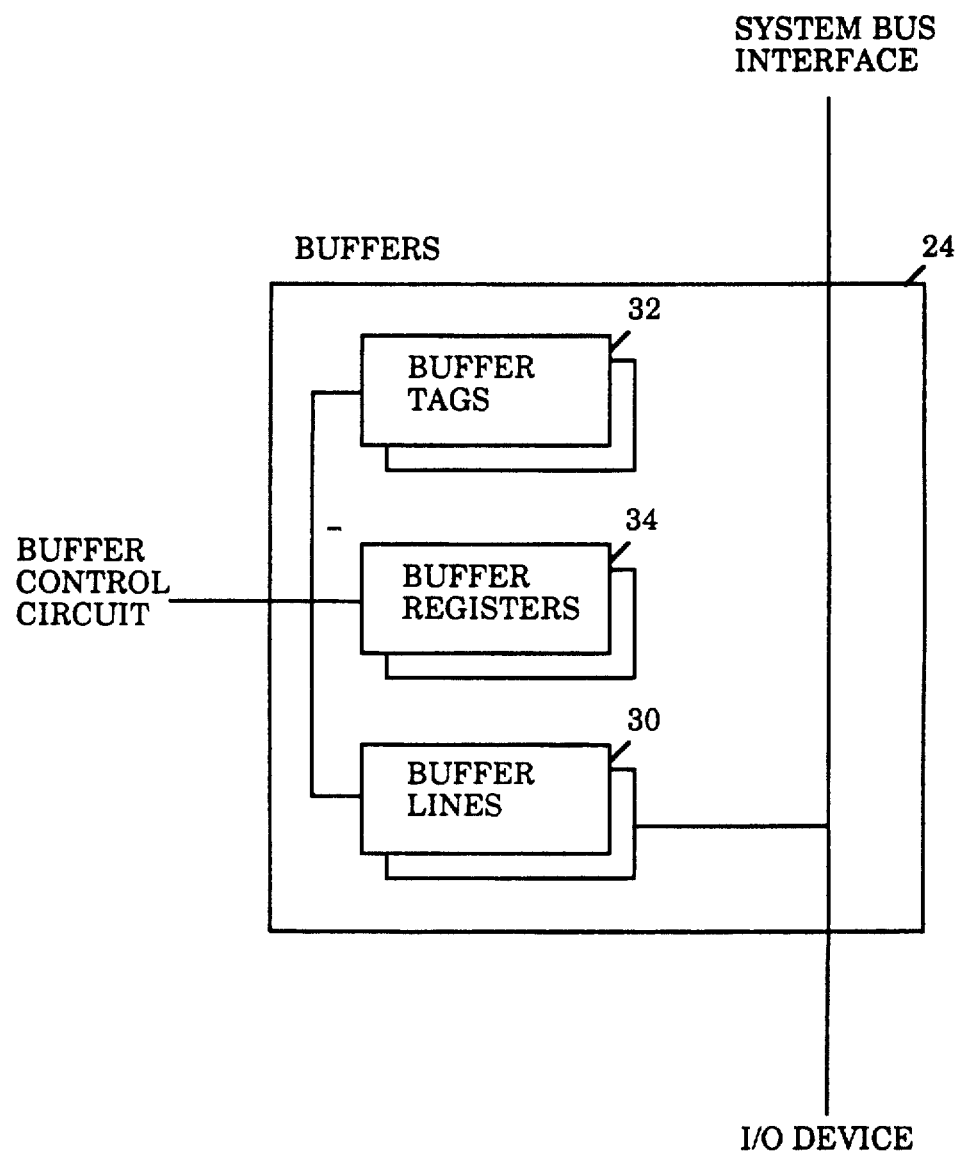
FIG. 3 shows a block diagram illustrating a subcomponent view of the buffers of the preferred embodiment of the present invention.

Referring now to FIG. 3, a block diagram illustrating a subcomponent view of the buffers of the preferred embodiment of the DMA controller of the present invention is shown. The plurality of buffers 24 comprise at least two buffer lines 30, at least two corresponding buffer tags 32 and at least two corresponding buffer registers 34. The buffer lines 30 are coupled to the buffer control circuit, the system bus interface and the I/O device. The corresponding buffer tags 32 and the buffer registers 34 are coupled to the buffer control circuit.

The buffer lines 30 receives the data being retrieved/pre-fetched from the system bus interface, stores them and sends them to the I/O device during read operations. Similarly, the buffer line 30 receives the data being written from the I/O device, stores them and sends them to the system bus interface during write operations. Each buffer line 30 is implemented with sufficient capacity to support the largest burst size supported by the system bus interface. In its presently preferred form, each buffer line 30 is implemented with the capacity of thirty-two bytes.

The buffer tags 32 store memory address tags identifying the memory addresses associated with the data bytes currently being stored in the corresponding buffer lines 30. The memory addresses identify the memory locations where the stored data bytes are read during read operations and where the stored data bytes are to be written during write operations.

The buffer registers 34 store validity bits during read operations and dirty bits during write write operations corresponding to the data bytes stored in the corresponding buffer line 30. The validity bits identifying whether the corresponding data bytes are valid, that is eligible for reading by the I/O device, and the dirty bits identify whether the corresponding data bytes are dirty, that is pending writing to the memory.

Figure 4A:
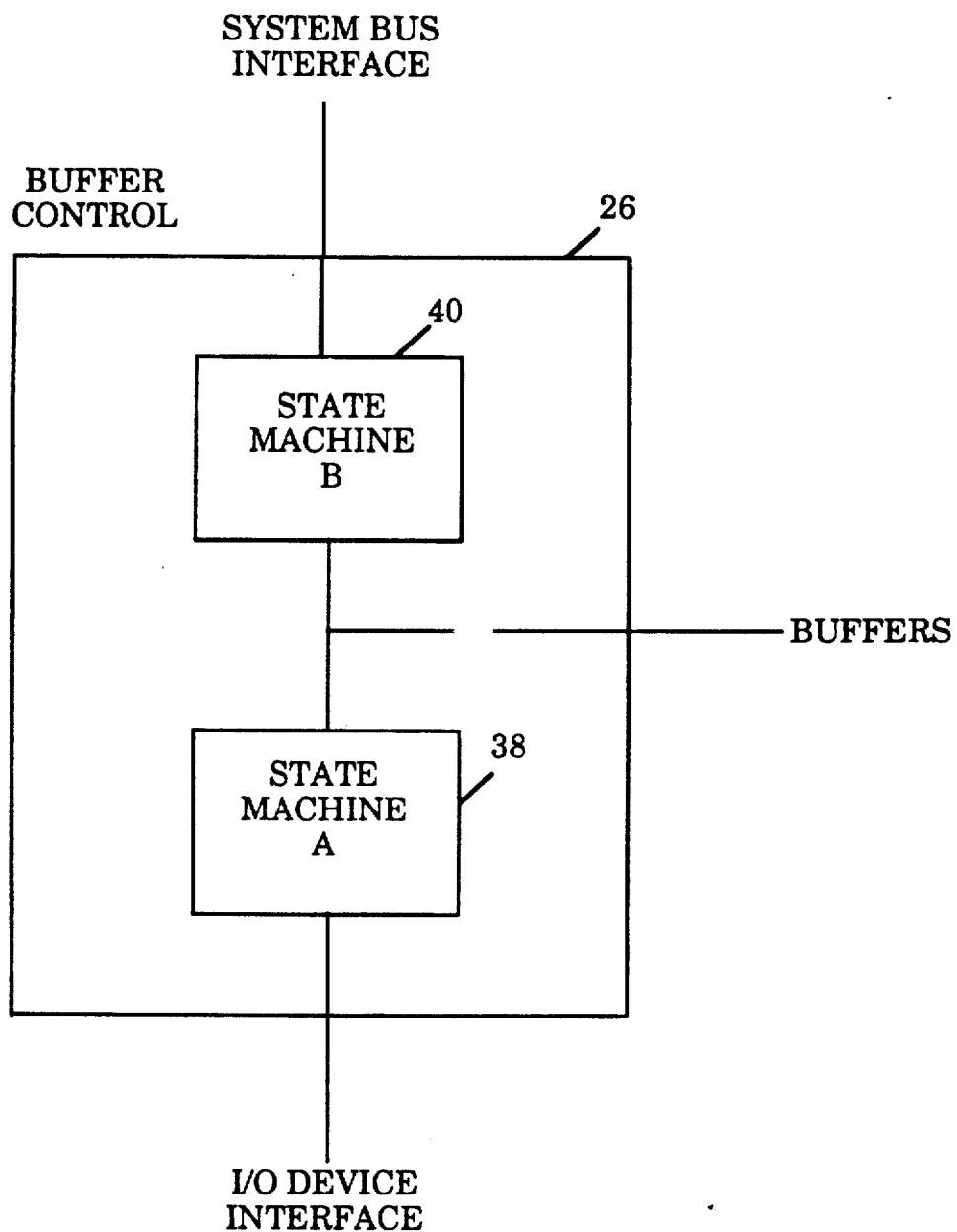
FIGS. 4a–4i show various diagrams illustrating subcomponent views of the buffer control circuit of the preferred embodiment of the present invention, its operational flows, and its operational states.

Referring now to FIG. 4a–4i, various diagrams illustrating subcomponent views of the buffer control circuit of the DMA controller of the present invention, its operational flow, and its operational states are shown. As shown in FIG. 4a, the buffer control circuit 26 comprises state machines A and B 38, 40. The state machines A and B 38, 40 control the selection of the buffer lines and the transfer of data in/out of the buffer lines during read/write operations.

Figure 4B:
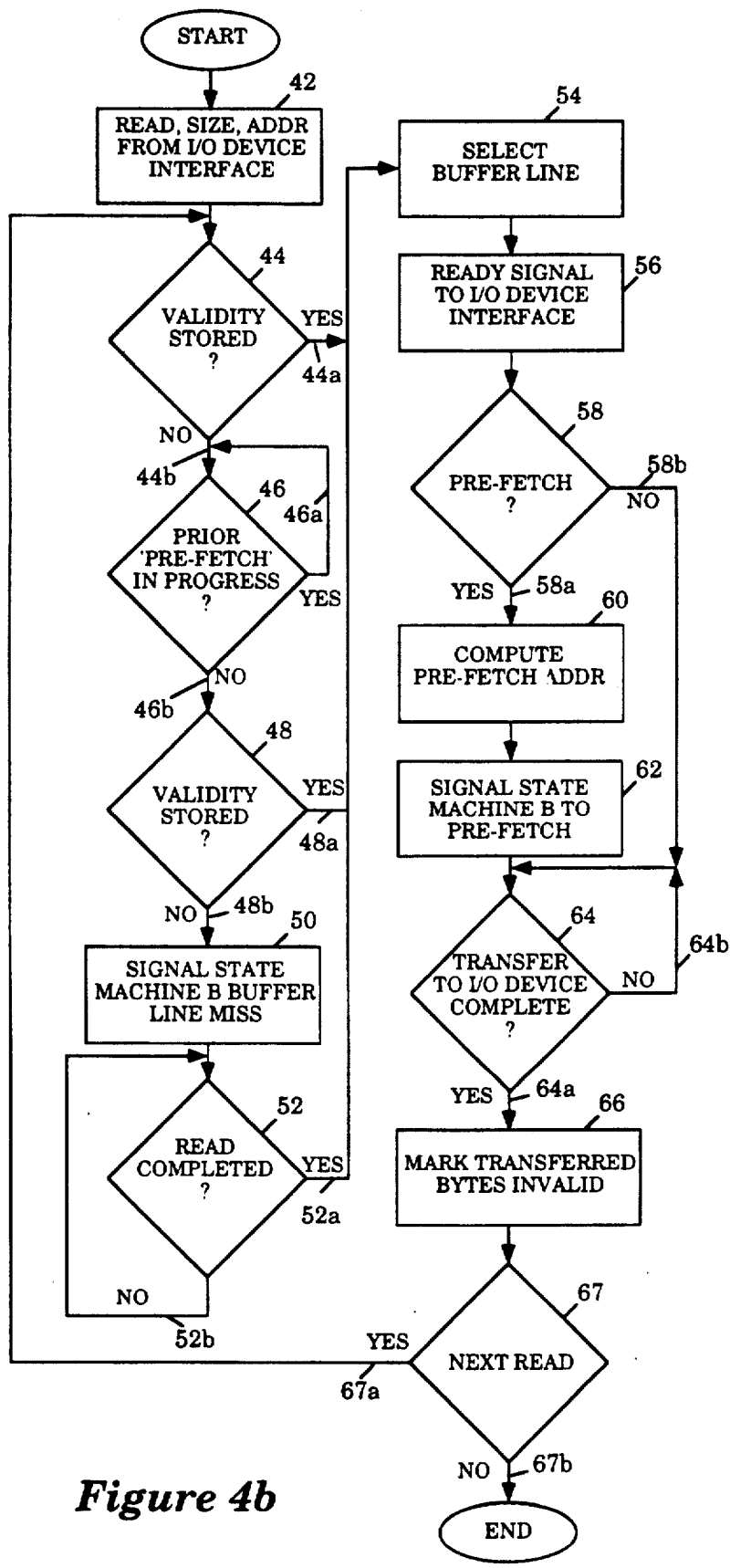

FIG. 4b illustrates the operational flow of state machine A for read operations. State machine A receives from the I/O device interface a read signal, a read size and a read address from the I/O device interface as inputs during a read operation, block 42. In response, state machine A determines if the data bytes identified by the read size and the read address are validly stored in one of the buffer lines, block 44.

If the data bytes are not validly stored in one of the buffer lines, branch 44b, state machine A determines if a prior "pre-fetch" is still in progress, block 46. If a prior "pre-fetch" is still in progress, state machine A waits for the prior "pre-fetch" to complete, branch 46a. Upon completion of the prior "pre-fetch", branch 46b, state machine A determines if the data bytes are now validly stored in one of the buffer lines again, block 48, that is, whether the data bytes were fetched by the prior "pre-fetch" just completed. If the data bytes are still not validly stored in one of the buffer lines, branch 48b, state machine A signals state machine B that a buffer line miss has occurred, block 50. State machine A then waits for the data bytes to be transferred from the memory into one of the buffer lines, block 52.

Before signaling state machine B that a buffer miss has occurred, block 50, state machine A selects a buffer line to receive the fixed size data block to be retrieved from the memory in a pre-determined manner, and stores the memory address tag for the fixed size data block to be retrieved in the buffer tag corresponding to the selected buffer line. In its presently preferred form, the least recently used buffer line is selected. It will be appreciated that the buffer line for receiving the fixed size data block being retrieved may be selected in a variety of manners for an embodiment of the present invention having more than two buffer lines, including but not limited to the least recently used approach.

Upon determination that the data bytes are validly stored in one of the buffer lines, branch 44a or 48b, or detection that the data bytes have just been transferred from memory into one of the buffer lines, branch 52a, state machine A selects the buffer line containing the data bytes for output to the I/O device, block 54, and outputs a data ready signal for the I/O device interface, block 56. State machine A then determines if another fixed size data block should be pre-fetched, block 58. If the determination to pre-fetch is made, branch 58a, state machine A computes the pre-fetch address, block 60, and signals state machine B to pre-fetch the fixed size data block, block 62. After determining not to pre-fetch, branch 58b, or signaling state machine B to pre-fetch, state machine A then monitors the transfer of the data bytes to the I/O device, block 64. Upon completion of transfer, branch 64a, state machine A marks the data bytes transferred invalid, block 66.

Similarly, before signaling state machine B to pre-fetch, block 62, state machine A selects a buffer line to receive the fixed size data block to be pre-fetched from the memory in a pre-determined manner, and stores the memory address tag for the fixed size data block to be pre-fetched in the buffer tag corresponding to the selected buffer line. In its presently preferred form, the least recently used buffer line is selected. It will also be appreciated that the buffer line for receiving the fixed size data block being pre-fetched may be selected in a variety of manners for an embodiment of the present invention having more than two buffer lines, including but not limited to the least recently used approach.

If another set of read signal, read size and read address are received from the I/O device interface, branch 67a, state machine A proceeds to satisfy the new request as described above. It is immaterial whether the next read address is sequential to the previous read address. It will be appreciated that it is also immaterial whether the fixed size data block being pre-fetched is completed or not, when the new set of read signal, read size and read address are received. As described earlier, if the new pair of read size and read address identifies data bytes that are not validly stored in one of the buffer lines and a prior "pre-fetch" is in progress, state machine A waits until the prior "pre-fetch" is completed before proceeding further to satisfy the new read.

In its presently preferred form, state machine A is implemented in a manner such that it makes the pre-fetch determination based on a pre-determined condition tailored to the read/write characteristics of the I/O device. The predetermined condition is tailored to the read characteristics of the I/O device to avoid superfluous pre-fetches. Specifically, state machine A is implemented to determine whether to initiate the pre-fetching based on the offset of the data bytes being transferred into the fixed size data block. In particular, state machine A is tailored to support the above exemplary network controller. It is implemented to initiate the pre-fetching if the data bytes being transferred are the sixth and seventh data bytes of the fixed size data block. By doing so, ample time is still available to complete the pre-fetch before the I/O device finish sequentially reading the rest of the data bytes in the fixed size data block, and yet superfluous pre-fetching when the I/O device is merely reading the 2-byte device descriptor may be avoided.

Similarly, in its presently preferred form, state machine A is also implemented in a manner such that the computation of the pre-fetch address is also tailored to the read characteristics of the I/O device. Specifically, state machine A is tailored to an I/O device that tends to read sequentially. It computes the pre-fetch address by adding the length of the fixed size data block to the read address. Additionally, state machine A is further tailored to an I/O device that tends to read within a single page in the memory. State machine A is implemented to abort the pre-fetch if the computed pre-fetch address is outside the current memory page. In particular, state machine A is tailored to an I/O device that tends to read within a 4K page boundary. It is implemented to abort the pre-fetch decision if the pre-fetch address is outside the current 4K memory page. By doing so, superfluous memory access errors may be avoided.

Additionally, for each set of read signal, read size and read address received, state machine A determines whether the memory addresses were previously read and whether the buffer line containing the data bytes referenced by the memory addresses has been refreshed since the data bytes were last read. If the memory addresses were previously read and the buffer line containing the data bytes has not been refreshed since the data bytes were last read, state machine A invalidates the contents of all the buffer lines, before proceeding; otherwise, state machine A proceeds without taking any preliminary action. These preliminary operations are performed for supporting polling by the I/O device, they may be skipped.

Furthermore, if the last data byte transferred to the I/O device is also the last data byte of the fixed size data block comprising the data bytes being transferred to the I/O device, state machine A is implemented to further mark the buffer line comprising the data bytes being transferred as the least recently used buffer line, otherwise, the other buffer line is marked as the least recently used buffer line. These marking operations are performance actions tailored to assist subsequent buffer line selection for receiving the fixed size data blocks being pre-fetched/retrieved from memory. For other embodiments of the present invention having more than two buffer lines, other equivalent performance action may be taken for speeding up buffer line selection.

Figure 4C:
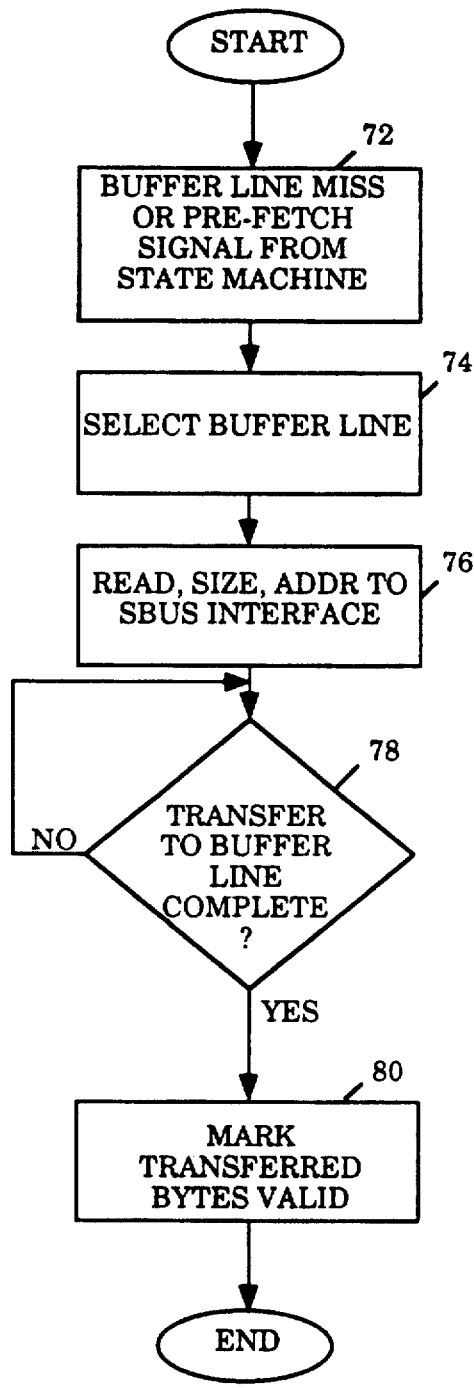

FIG. 4c illustrates the operational flow of state machine B during read operations. State machine B is signaled by state machine A that a buffer line miss has occurred or a determination has been made to pre-fetch a fixed size data block, block 72. Upon receipt of either signal, state machine B selects the buffer line selected by state machine A to receive the fixed size data block being pre-fetched/retrieved from the memory, block 74.

Upon selecting the buffer line selected by state machine A to receive the fixed size data block being pre-fetched/retrieved, state machine B then outputs a read signal and a pre-fetch/retrieval address for the system bus interface, block 76. The pre-fetch/retrieval address is retrieved from the buffer tag corresponding to the selected buffer line. Then, state machine B monitors the transfer of the data block being pre-fetched/retrieved into their storing buffer line, block 78. Upon receipt of the data bytes, state machine B marks the data bytes as valid, block 80.

Figure 4D:
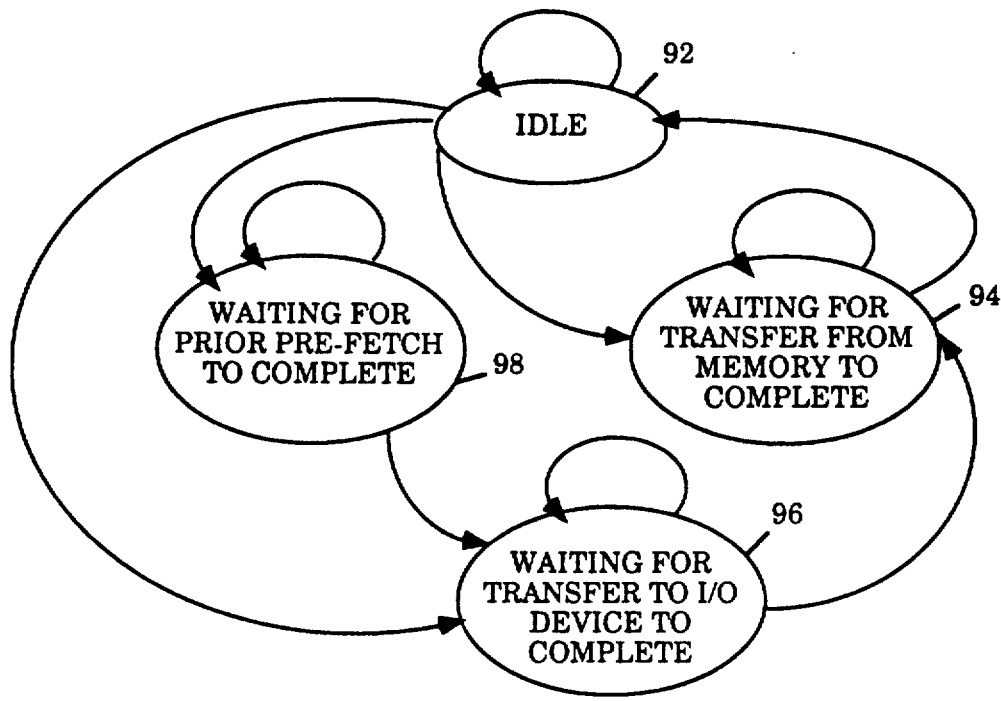

FIG. 4d illustrates the operational states of state machine A during read operations. Initially, state machine A is in an idle state 92. It either remains in the idle state 92, enters the state of waiting for data transfer to I/O device to complete 94, enters the state of waiting for data transfer from memory to one of the buffer line to complete 96, or enters the state of waiting for a prior pre-fetch to complete 98. If the data bytes being read are validly stored in one of the buffer lines, as described earlier, state machine A sends a data ready signal to the I/O device interface and enters the state of waiting for data transfer to I/O device to complete 94. If the data bytes being read are not validly stored in one of the buffer lines, and a prior pre-fetch is not in progress, it selects a buffer line, stores the read address memory address tag into the corresponding buffer tag, signals state machine B to retrieve a fixed block of data bytes comprising the data bytes being read, and enters the state of waiting for data transfer from memory to one of the buffer lines to complete 96. Otherwise, state machine A enters the state of waiting for the prior pre-fetch to complete 98.

From the state of waiting for a prior pre-fetch to complete 98, state machine A either remains in that state 98, or upon completion of the prior pre-fetch, signals state machine B to retrieve the data bytes being read, and enters the state of waiting for data transfer from memory to one of the buffer line to complete 96. From the state of waiting for data bytes to be transferred from the memory to one of the buffer lines, state machine A either remains in the state 96 or upon completion of the transfer, signals the I/O device interface and enters the state of waiting for data bytes transfer from one of the buffer lines to the I/O device to complete 94. From the state of waiting for data bytes transfer from one of the buffer lines to the I/O device to complete 94, it either remains in that state 94, or upon completion of the data bytes transfer to the I/O device, returns to the idle state 92.

Figure 4E:
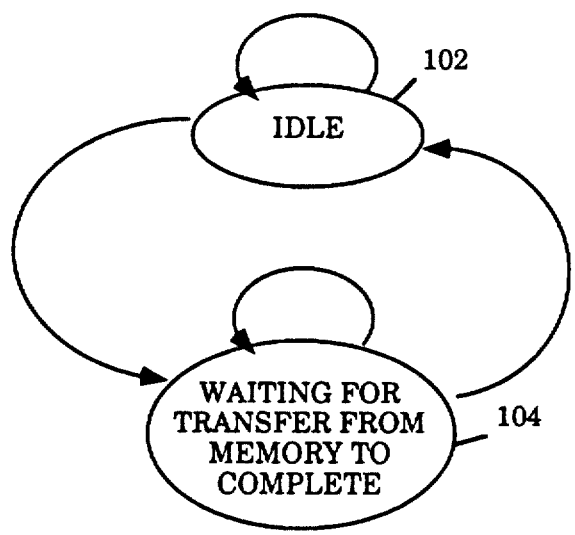

FIG. 4e illustrates the operational states of state machine B during read operations. Initially, state machine B is in an idle state 102. From the idle state 102, state machine B either remains in that state 102, or upon being signaled by state machine A to pre-fetch or retrieve a fixed block of data bytes, state machine B selects the buffer line selected by state machine A, retrieves the pre-fetch/retrieval address from the corresponding buffer tag, outputs a read signal and the pre-fetch/retrieval address for the system bus, and enters the state of waiting for data bytes transfer from the memory to one of the buffer lines to complete 104. From the state of waiting for data bytes transfer from the memory to one of the buffer lines to complete 104, state machine B either remains in that state 104 or upon completion of the data bytes transfer from the memory to one of the buffer lines, returns to the idle state 102.

Figure 4F:
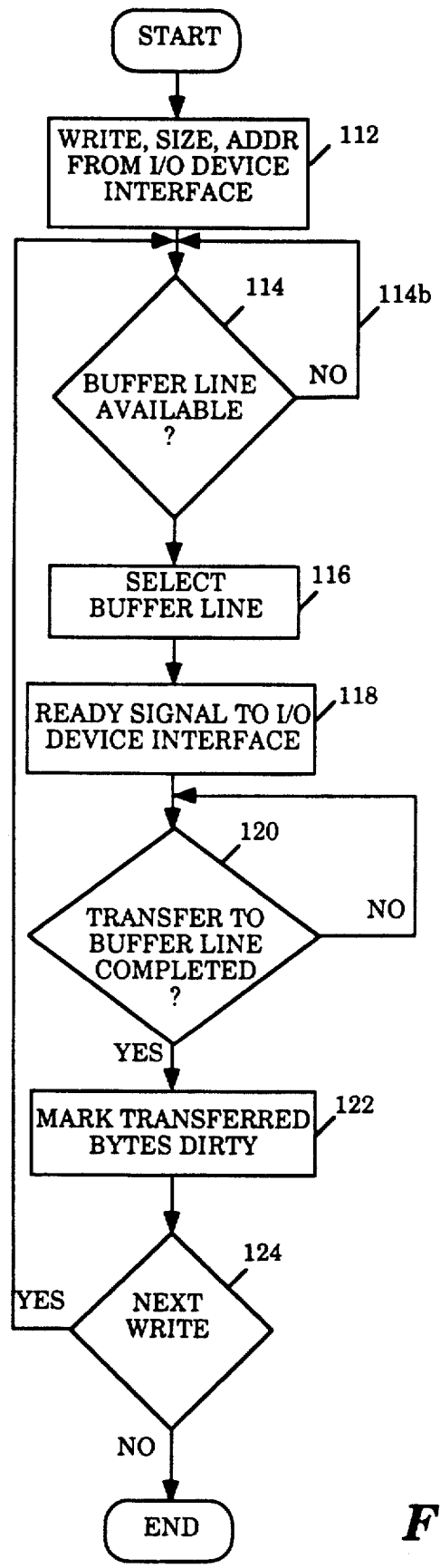

FIG. 4f illustrates a subcomponent view of the operational flow of state machine A during write operations. State machine A receives from the I/O device interface a write signal, a write size and a write address, block 112. In response, state machine A determines if a buffer line is available to receive the data bytes to be written into the memory locations identified by the pair of write size and write address, block 114. If there is no buffer line available to receive the data bytes, branch 114b, state machine A waits until a buffer line becomes available.

A buffer line is available to receive the data bytes if the pair of write size and write address identifies memory addresses that are part of the memory addresses identified by one of the buffer tags. A buffer line is also available to receive the data bytes if the pair of write size and write address identifies memory addresses that are not part of the memory addresses identified by any of the buffer tags, and at least one of the buffer registers contains no dirty bit.

If a buffer line is available to receive the data bytes, branch 114a, state machine A selects a buffer line to receive the data bytes, block 116. If the buffer line is available under the former case, state machine A selects the corresponding buffer line to receive the data bytes. If the buffer line is available under the latter case, in its presently preferred form, state machine A selects the least recently used buffer line of the buffer lines that do not contain any dirty byte to receive the data bytes being written into memory. It will also be appreciated the buffer line may be selected in a variety of other manners, particularly for an embodiment of the present invention having more than two buffer lines.

Upon selection of a buffer line to receive the data bytes, state machine A provides a write ready signal to the I/O device interface, block 118. State machine A then monitors the transfer of the data bytes from the I/O device to the selected buffer line, block 120. Upon completion of the transfer, state machine A marks the transferred data bytes as dirty, block 122. The data bytes are not re-transferred to the memory "immediately". Instead, state machine A proceeds to serve the next write, if there is one, block 124, as described above. State machine B, as described below is responsible for ultimately writing the data bytes into the memory. The subsequent write operations are served by state machine A independent of whether state machine B is in the middle of writing some of the prior data bytes to the memory.

Figure 4G:
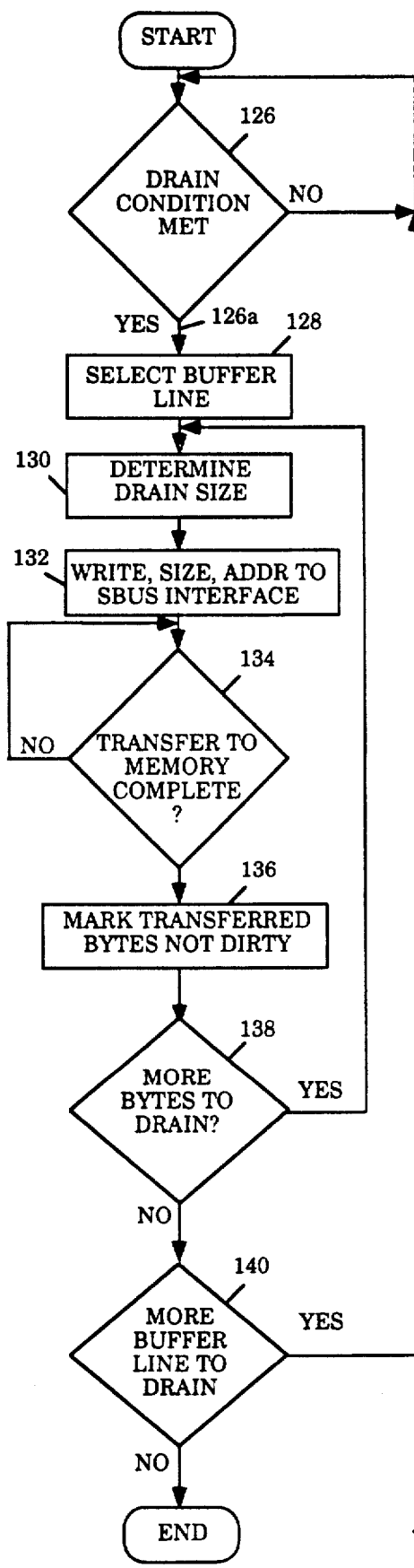

FIG. 4g illustrates the operational flow of state machine B during write operations. Upon detecting the presence of dirty bytes in any of the buffer lines, state machine B monitors if at least one draining condition is met for at least one of the buffer lines having dirty bytes, block 126. If at least one of the buffer lines with at least one dirty byte is to be drained, state machine B proceeds to drain them, blocks 128-138.

In the presently preferred form, a buffer line is to be drained if a data byte is transferred from the I/O device to the last buffer location of the buffer line. The least recently used buffer line of the buffer lines with at least one dirty data byte is also to be drained if there is no buffer line available to receive data bytes from a write operation. Additionally, all buffer lines with at least one dirty byte are to be drained if a read signal is received following a series of write operations.

If at least one of the draining condition is met for one of buffer lines with at least one dirty byte, branch 126a, state machine B selects one of the buffer lines to be drained, block 128. In the presently preferred form, the least recently used buffer line of the buffer lines to be drained is selected. State machine B then determines the most optimal drain size based on the number of dirty bytes to be drained, block 130. After selecting the drain size, state machine B provides the system bus interface with a write signal, a write size and a write address, block 132. State machine B then monitors the transfer to memory, block 134. Upon completion of the transfer, state machine B marks the transferred data bytes in the draining buffer line as not dirty. State machine B repeats the above steps until all dirty bytes from a buffer line to be drained are drained, block 138. Then state machine B repeats the above steps for the next buffer line to be drained until all buffer lines to be drained have been drained, blocks 140.

Figure 4H:
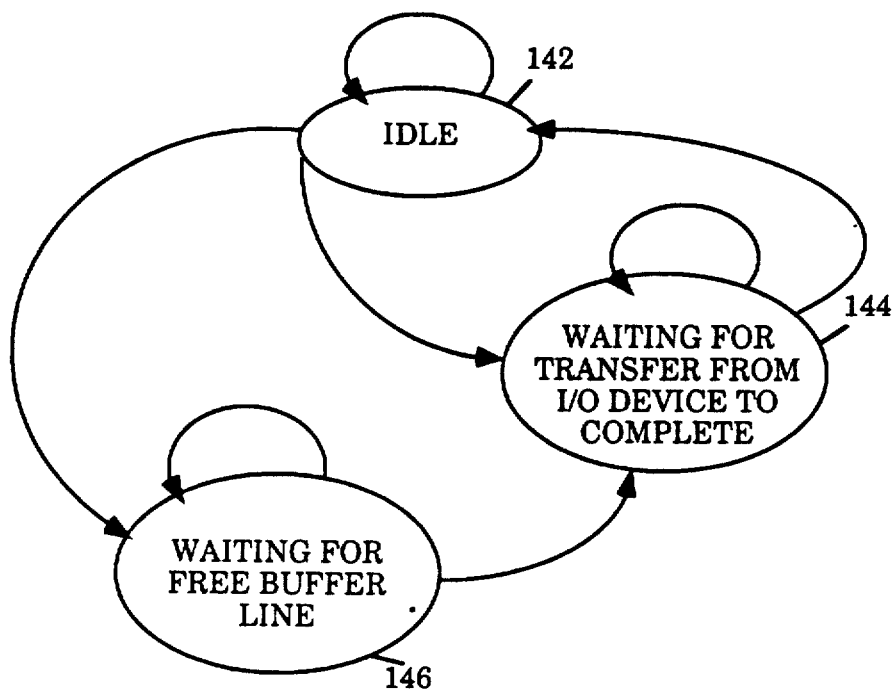

FIG. 4h illustrates the operating states of state machine A during write operations. Initially, state machine A is in an idle state 142. From the idle state 142, state machine A either enters the state of waiting for data bytes transfer from the I/O device to one of the buffer lines to complete 144 or enters the state of waiting for a free buffer line to receive the data bytes to be written 146. If there is at least one free buffer line to receive the data bytes to be written, as described earlier, state machine A sends a write ready signal to the I/O device interface and enters the former state 144; otherwise, it enters the latter state 146.

From the state waiting for a free buffer line to receive the data bytes being written 146, state machine A either remains in that state 146 or upon availability of a buffer line, enters the state of waiting for data bytes to be transferred from the I/O device to one of the buffer line to complete 144. From the state of waiting for data bytes to be transferred from the I/O device to one of the buffer line to complete 144, state machine A either remains in that state 144, or upon completion of the data bytes transfer from the I/O device to one of the buffer lines, returns to the idle state 142.

Figure 4I:
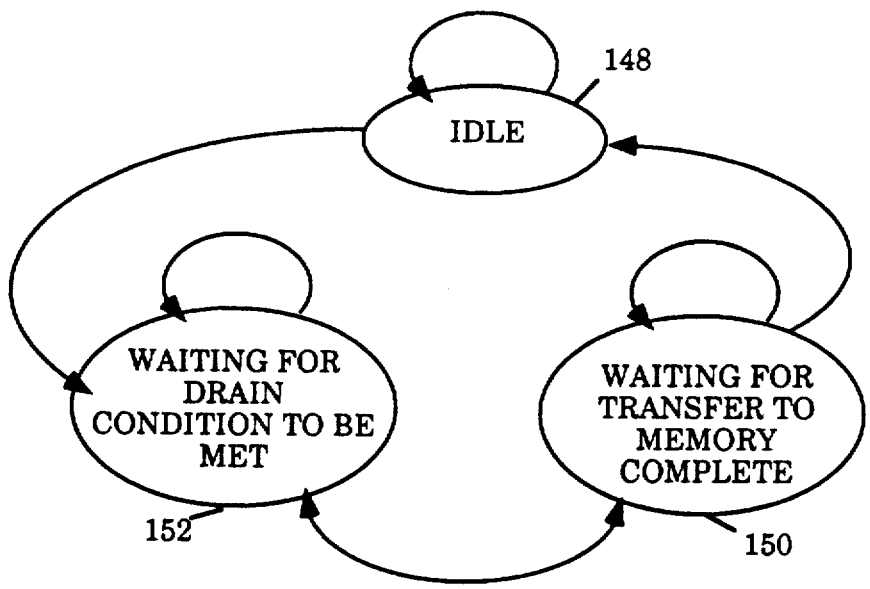

FIG. 4i illustrates the operational states of state machine B during write operations. Initially, state machine B is in an idle state 146. From the idle state 146, state machine B either remains in that state 146, or upon detecting the presence of at least one dirty byte in at least one of the buffer line, enters the state of waiting for at least one draining condition for at least one buffer line to be met 152. From this state 152, state machine B either remains in it 152 or upon detecting at least one buffer line having at least one dirty byte meeting at least one of the draining conditions, selects one of the buffer lines to be drained for draining, sends the appropriate information to the system bus interface, and enters the state of waiting for data bytes transfer to memory to be completed 150.

From the state of waiting for data bytes transfer to memory to be completed 150, state machine B either remains in that state 150, returns to the state of waiting for at least one draining condition for at least one buffer line having at least one dirty byte to be met 152 or the idle state 148. If there is at least another buffer line having at least one dirty byte, state machine B returns to the state of waiting for at least one draining condition for at least one buffer line having at least one dirty byte to be met 152, otherwise, it returns to the idle state 148.

Figure 5A:
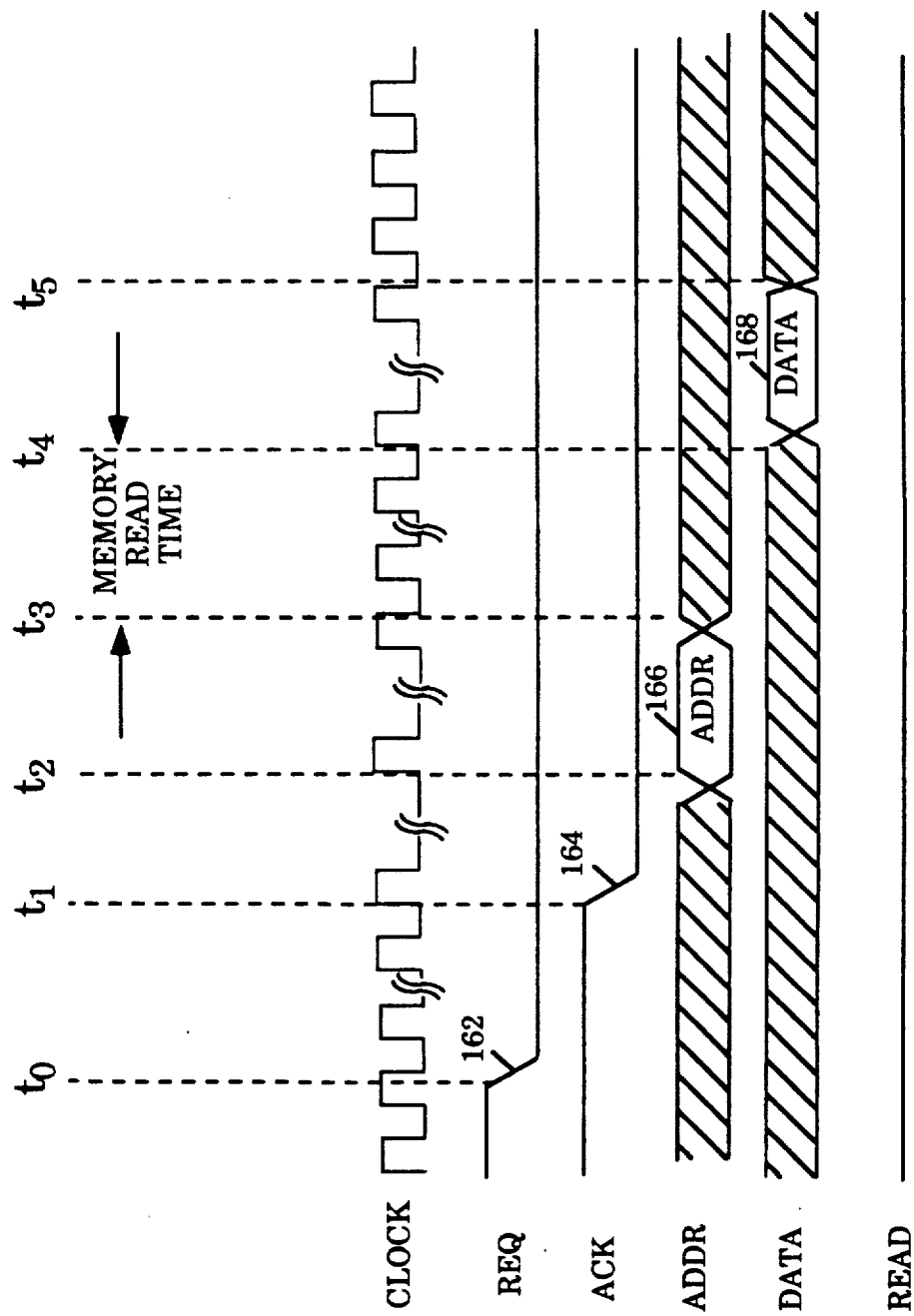
FIGS. 5a–5d show various timing diagrams illustrating component views of some of the signals timing between the I/O device and the DMA controller of the present invention, and between the DMA controller and the system bus.

Referring now to FIGS. 5a-5d, various timing diagrams illustrating a component view of some of the signals timing between the I/O device and the DMA controller of the present invention, and between the DMA controller and the system bus are shown. FIG. 5a illustrates some of the signals timing between the I/O device and the DMA controller during read operations. A request signal 162 is first issued by the I/O device at time to. An acknowledgement signal 164 is subsequently issued by the I/O device interface at time $t_1$. The read address 166 is then issued by the I/O device at time $t_2$ and completed at time $t_3$. The data 168 are read by the I/O device at time $t_4$ and completed at time $t_5$. The read signal 170 is maintained by the I/O device throughout the entire period. The data bytes being read, if necessary, are retrieved from memory between time $t_3$ and $t_4$.

Figure 5B:
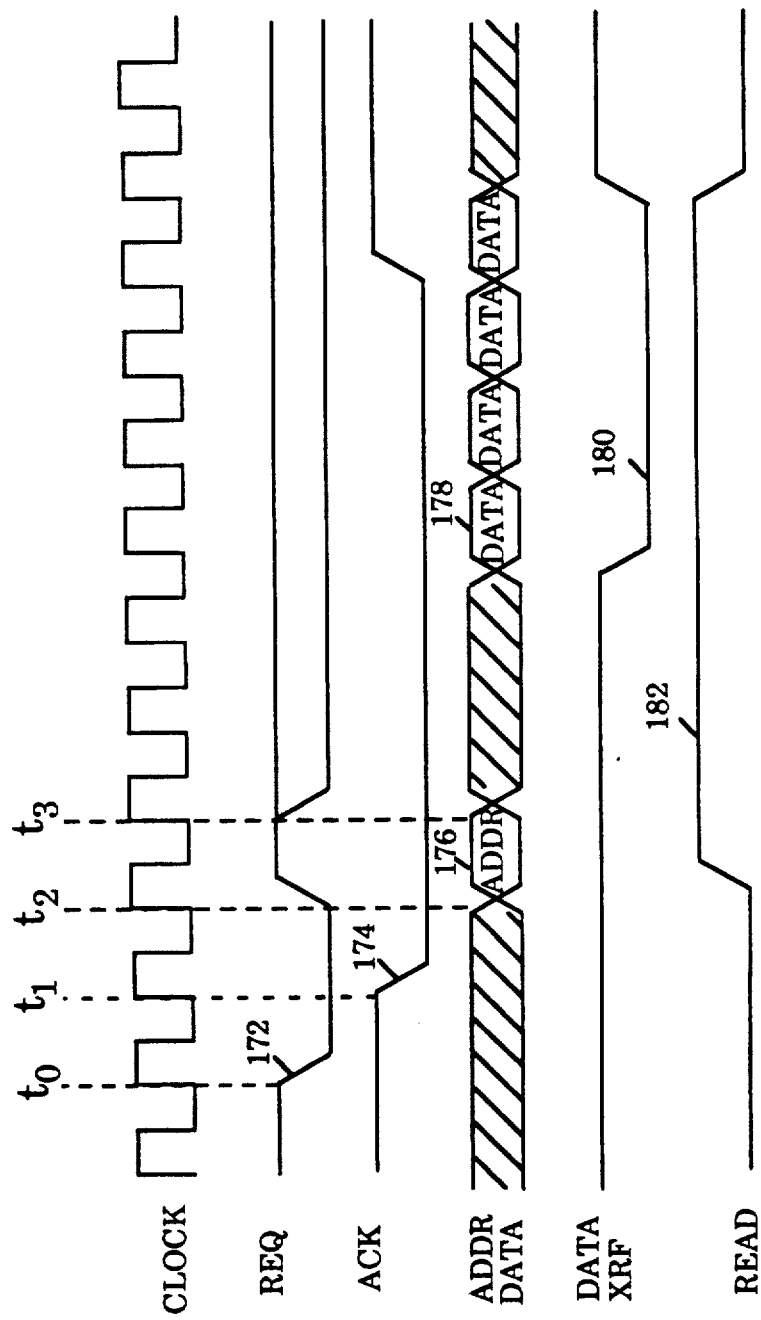

FIG. 5b illustrates some of the signals timing between the DMA controller and the system bus during read operations. To pre-fetch/retrieve a fixed data block from memory, a request signal 172 is first issued by the system bus interface at time to. An acknowledgement signal 174 is subsequently issued by the system bus at time $t_1$. The read address 176 is then issued by the system bus interface at time $t_2$ and completed at time $t_3$. The prefetched/retrieved data 178 are subsequently returned by the system bus. The data transfer signal 180 is maintained by the system bus during the data transfer. The read signal 182 is maintained by the system bus interface throughout the entire period.

Figure 5C:
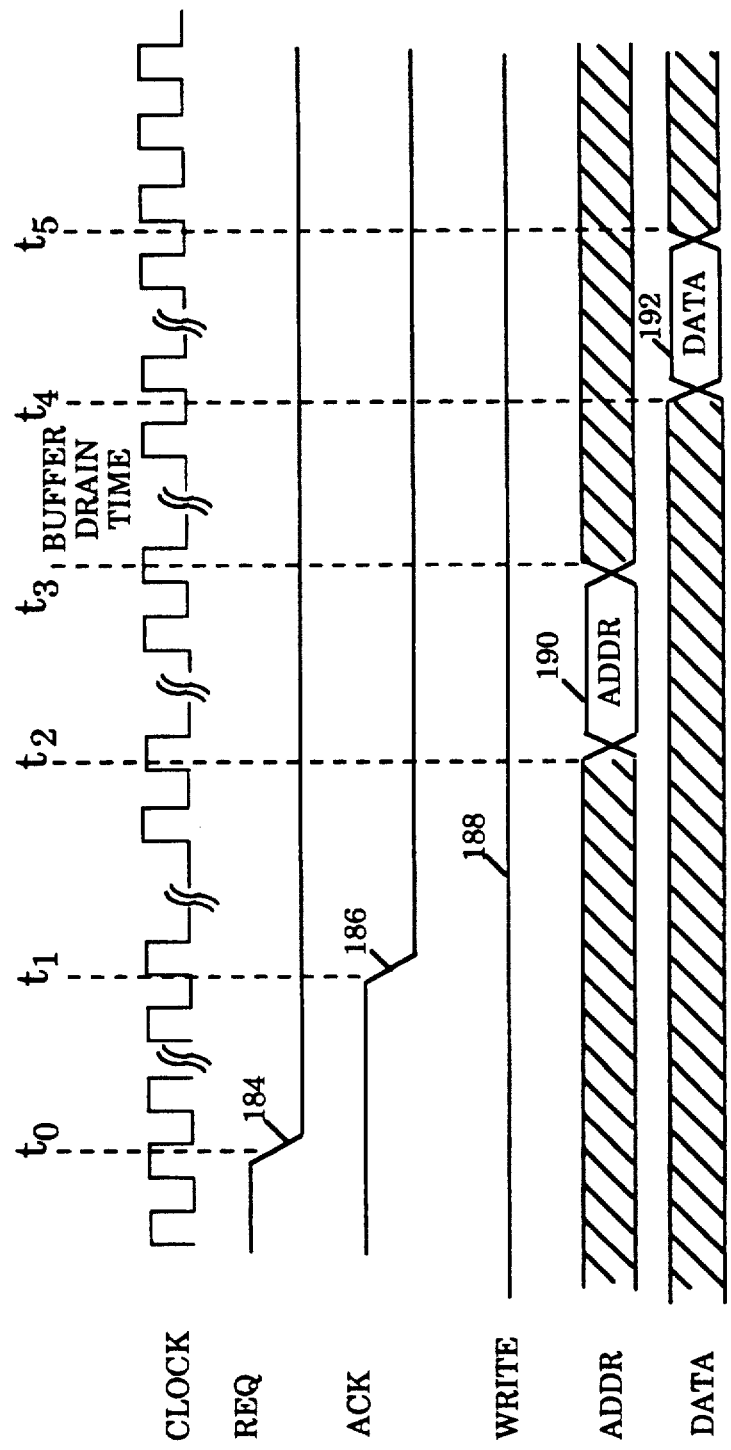

FIG. 5c illustrates some of the signals timing between the I/O device and the DMA controller during write operations. Similarly, a request signal 184 is first issued by the I/O device at time to. An acknowledgement signal 186 is subsequently issued by the I/O device interface at time $t_1$. The write address 190 is then issued by the I/O device at time $t_2$ and completed at time $t_3$. The write data 192 are issued by the I/O device at time $t_4$ and completed at time $t_5$. The write signal 188 is maintained by the I/O device throughout the entire period. A buffer line, if necessary, is drained between time $t_3$ and $t_4$.

Figure 5D:
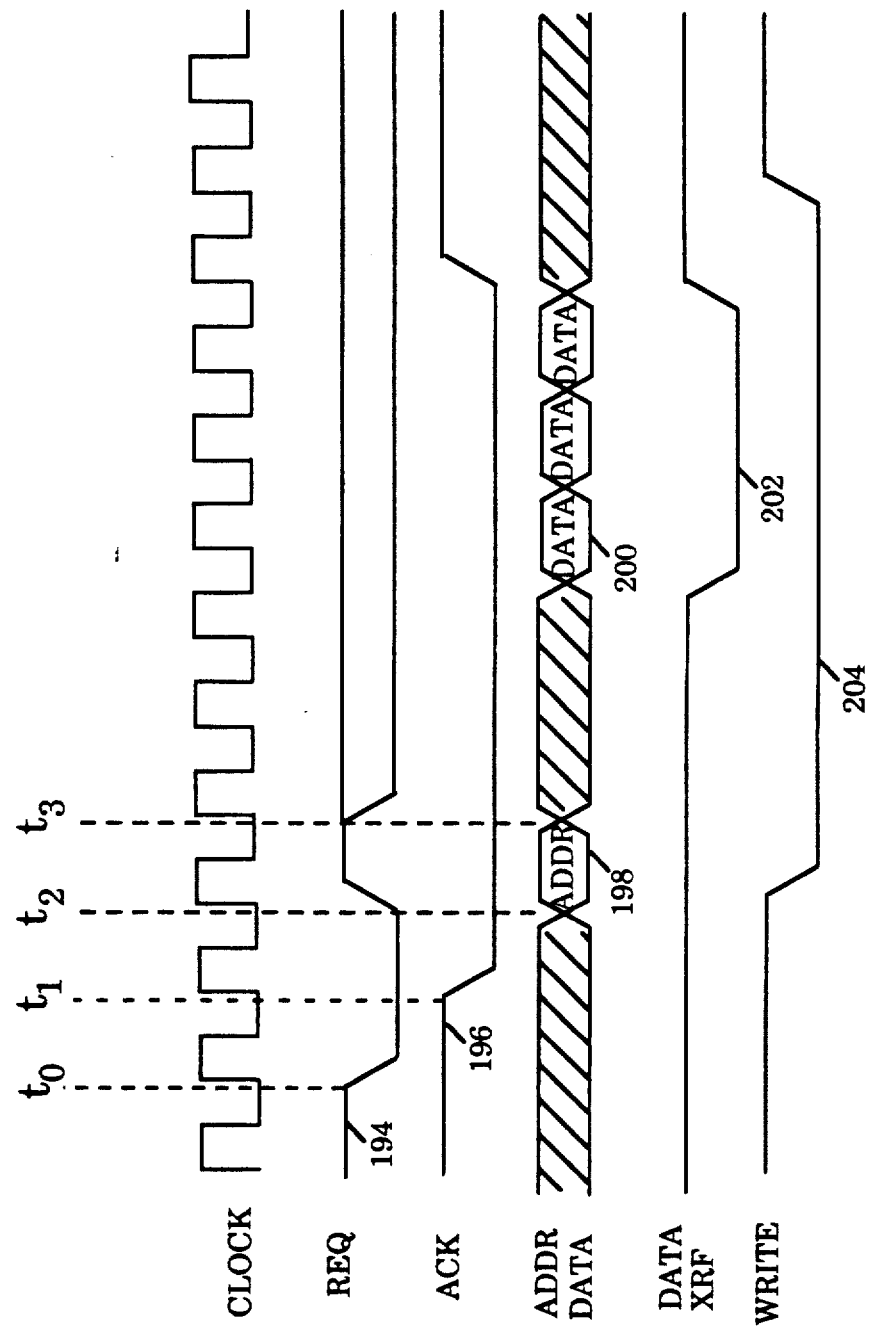

FIG. 5d illustrates some of the signals timing between the DMA controller and the system bus during write operations. Similarly, a request signal 194 is first issued by the system bus interface at time to. An acknowledgement signal 196 is subsequently issued by the system bus at time $t_1$. The write address 198 is then issued by the system bus interface at time $t_2$ and completed at time $t_3$. The write data 200 are subsequently issued by the system bus interface. The data transfer signal 202 is maintained by the system bus interface during the data transfer. The write signal 204 is maintained by the system bus interface throughout the entire period.

For simplicity of description and ease of understanding, the method and the DMA controller for asynchronously reading/writing data from/to the memory of the present invention have been described in the context of a single I/O device. The method and DMA controller for asynchronously reading/writing data from/to the memory of the present invention as applied to mutliple I/O devices will now be described.

Figure 6:
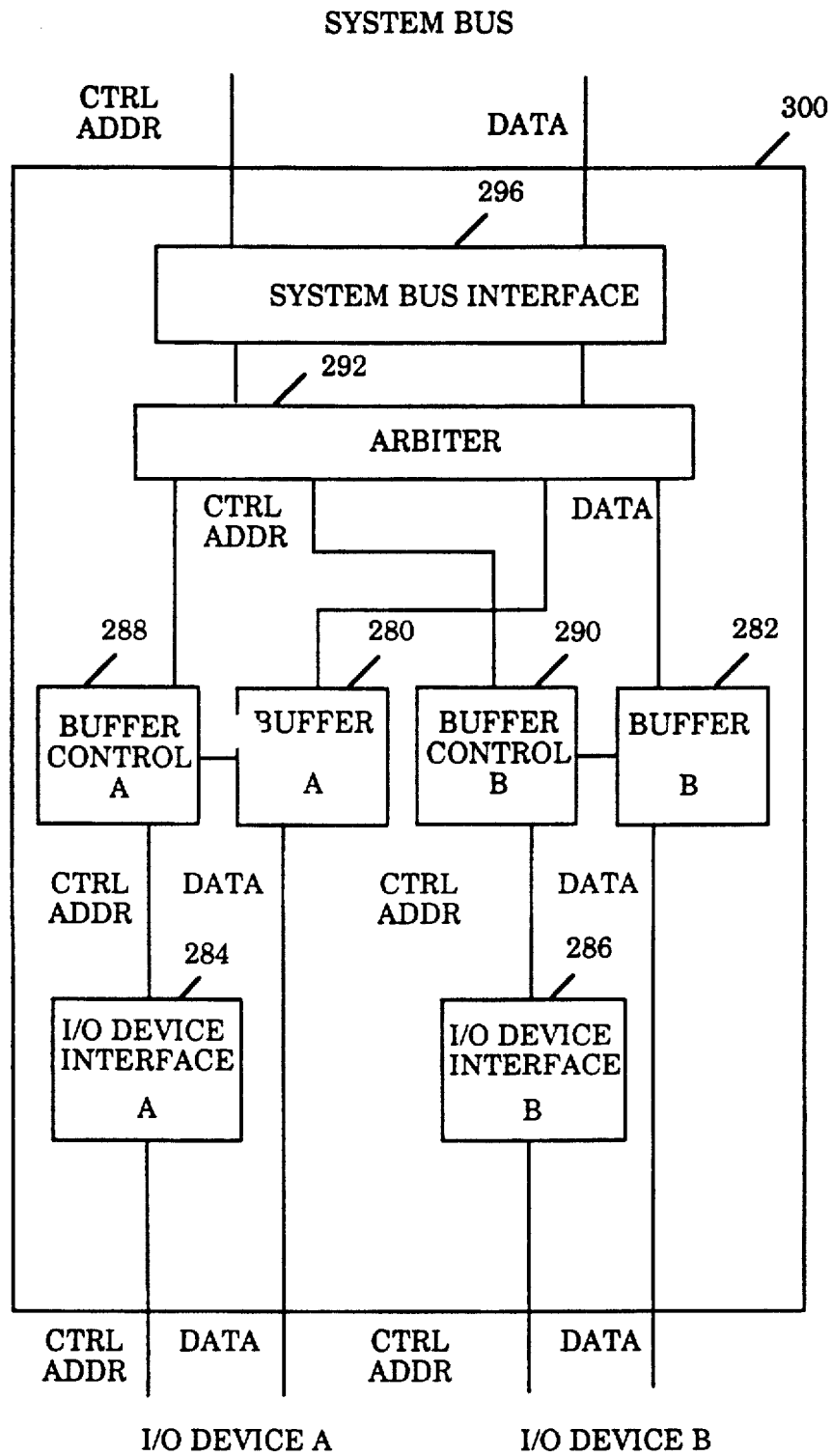
FIG. 6 shows a block diagram illustrating a component view of the preferred embodiment of the DMA controller of the present invention applied to a first and second input-output devices.

Referring now to FIG. 6, a block diagram illustrating a component view of the DMA controller for asynchronously reading/writing data from/to a memory by a first and second I/O device is shown. The DMA controller 300 comprises a first and second plurality of buffers 280, 282 coupled to a first and second I/O devices (not shown) respectively, and a first and second corresponding buffer control circuits 288, 290 coupled to the first and second buffers 280, 282. The DMA controller 300 further comprises a first and second/O device interfaces 284, 286 coupled to the first and second buffer control circuits 288, 290 and the first and second I/O devices respectively. The DMA controller 300 further comprises a system bus interface 296 coupled to the system bus (not shown), an arbiter 292 coupled to the system bus interface 296, the first and second buffer control circuit 288, 290, and the first and second plurality of buffers 280, 282.

Each plurality of buffers 280 or 282, each I/O device interface 284 or 286, each buffer control circuit 288, 290 and the system bus interface 296 are used or function as previously described. The arbiter 292 determines which buffer control circuit 288 or 290 works with the system bus interface 296. The arbiter 292 also determines which plurality of buffers 280, 282 works with the system bus interface 296. Once the arbitration is made, the DMA controller 300 asynchronously reads/writes data from/to the memory as described earlier.

While the present invention has been described in terms of a preferred embodiment, those skilled in the art will recognize that the invention is not limited to the embodiment described. The method and DMA controller for asynchronously reading/writing data from/to a memory of the present invention can be practiced with modification and alteration within the spirit and scope of the appended claims to serve a wide variety of I/O devices and memory.

What is claimed is:

1. A method for asynchronously reading data from a memory, and writing data into said memory, with improved throughput, said method comprising the data reading steps of:

receiving a first read signal, a first read size and a first read address from a first input-output device, said first read signal in conjunction with said first read size and said first read address identifying $n_1$ data bytes to be retrieved and returned to said first input-output device, $n_1$ being equal to at least one;

retrieving a first $m_1$ data bytes comprising said $n_1$ data bytes from said memory, storing said retrieved first $m_1$ data bytes into a first read buffer, and marking said stored first $m_1$ data bytes as valid, $m_1$ being greater than or equal to $n_1$;

sending said validly stored $n_1$ data bytes from said first read buffer to said first input-output device and marking said validly stored $n_1$ data bytes as invalid;

determining if a second $m_1$ data bytes are to be pre-fetched from said memory, and if said second $m_1$ data bytes are to be pre-fetched, pre-fetching and storing said second $m_1$ data bytes into a second read buffer, and marking said stored second $m_1$ data bytes as valid, said pre-fetching determination being made in a pre-determined manner, said pre-fetching determination, pre-fetching, storing, and marking of said second $m_1$ data bytes, being performed while said validly stored $n_1$ data bytes are retrieved from said first read buffer and returned to said first input-output device;

receiving a second read signal, a second read size and a second read address from said first input-output device, said second read signal in conjunction with said second read size and said second read address identifying $n_2$ data bytes to be retrieved and returned to said first input-output device, $n_2$ being equal to at least one;

determining if said $n_2$ data bytes are validly stored in one of said first and second read buffers, and if said $n_2$ data bytes are not validly stored in one of said first and second read buffers, retrieving a third $m_1$ data bytes comprising said $n_2$ data bytes from said memory, storing said retrieved third $m_1$ data bytes into a third read buffer, and marking said stored third $m_1$ data bytes as valid, $m_1$ being greater than or equal to $n_2$, said valid storage determination being made independent of whether said second read address is sequential to said first read address; and sending said validly stored $n_2$ data bytes from one of said first, second and third read buffers to said first input-output device and marking said validly stored $n_2$ data bytes as invalid.

2. The method for asynchronously reading data from a memory, and writing data into said memory, with improved throughput, as set forth in claim 1, wherein said method further comprises the data writing steps of:

receiving a first write signal, a first write size, and a first write address from said first input-output device, said first write signal in conjunction with said first write size and said first write address identifying where in said memory $n_3$ data bytes are to be stored, $n_3$ being equal to at least one;

receiving said $n_3$ data bytes from said first input-output device and storing said $n_3$ data bytes into a first write buffer and marking said $n_3$ data bytes as dirty;

determining if at least one of a plurality of draining conditions is met for said first write buffer, and if at least one of said draining conditions is met, draining at most a first $m_2$ dirty data bytes from said first write buffer into said memory and marking said first $m_2$ dirty data bytes drained as not dirty, said first $m_2$ dirty data bytes comprising said $n_3$ dirty data bytes, $m_2$ being equal to or greater than $n_3$;

receiving a second write signal, a second write size, and a second write address from said first input-output device, said second write signal in conjunction with said second write size and said second write address identifying where in said memory $n_4$ data bytes are to be stored, $n_4$ being equal to at least one, said second write signal, second write size, and second write address being received independent of whether said first write buffer is being drained;

receiving said $n_4$ data bytes from said input-output device and storing said $n_4$ data bytes into a second write buffer and marking said $n_4$ data bytes as dirty, said $n_4$ data bytes being received, stored and marked dirty independent of whether said first write buffer is being drained;

determining if at least one of said plurality of draining conditions is met for said second write buffer, and if at least one of said draining conditions is met, draining at most a second $m_2$ dirty data bytes from said second write buffer into said memory and marking said second $m_2$ dirty data bytes drained as not dirty, said second $m_2$ dirty data bytes comprising said $n_4$ dirty data bytes, $m_2$ being equal to or greater than $n_4$;

receiving a third write signal, a third write size, and a third write address from said first input-output device, said third write signal in conjunction with said third write size and said third write address identifying where in said memory $n_5$ data bytes are to be stored, $n_5$ being equal to at least one, said third write signal, third write size, and third write address being received independent of whether said first and second write buffers are being drained;

receiving said $n_5$ data bytes from said first input-output device, storing said $n_5$ data bytes into a third write buffer and marking said $n_5$ data bytes as dirty, said $n_5$ data bytes being stored and marked dirty independent of whether one of said first and second write buffers is being drained; and determining if one of said plurality of draining conditions is met for said third write buffer, and if one of said draining conditions is met, draining at most a third $m_2$ dirty data bytes from said third write buffer into said memory and marking said third $m_2$ dirty data bytes as not dirty, said third $m_2$ dirty data bytes comprising said $n_5$ dirty data bytes, $m_2$ being equal to or greater than $n_5$.

3. The method for asynchronously reading data from a memory, and writing data into said memory, with improved throughput, as set forth in claim 2, wherein, $m_2$ equals $m_1$;

said first, second and third read buffers, and said first, second and third write buffers are the same first, second and third buffers respectively; and said data reading steps and said data writing steps are performed for said first input-output device asynchronously.

4. The method for asynchronously reading data from a memory, and writing data into said memory, with improved throughput, as set forth in claim 3, wherein said third read buffer is the least recently used of said first and second buffers.

5. The method for asynchronously reading data from a memory, and writing data into said memory, with improved throughput, as set forth in claim 3, wherein said steps for reading data and said steps for writing data are implemented by a direct memory access controller disposed on a single integrated circuit.

6. The method for asynchronously reading data from a memory and writing data into said memory, with improved throughput, as set forth in claim 3, wherein said method further comprising the data reading steps of:

receiving a fifth read signal, a fifth read size and a fifth read address from a second input-output device, said fifth read signal in conjunction with said fifth read size and said fifth read address identifying $n_6$ data bytes to be retrieved and returned to said second input-output device, $n_6$ being equal to at least one;

retrieving a first $m_3$ data bytes comprising said $n_6$ data bytes from said memory, storing said retrieved first $m_3$ data bytes into a fourth read buffer, and marking said stored first $m_3$ data bytes as valid, $m_3$ being greater than or equal to $n_6$;

sending said validly stored $n_6$ data bytes from said fourth read buffer to said second input-output device and marking said validly stored $n_6$ data bytes as invalid;

determining if a second $m_3$ data bytes are to be pre-fetched from said memory, and if said second $m_3$ data bytes are to be pre-fetched, pre-fetching and storing said second $m_3$ data bytes into a fifth read buffer, and marking said stored second $m_3$ data bytes as valid, said pre-fetching determination being made in a pre-determined manner, said pre-fetching determination, pre-fetching, storing, and marking of said second $m_3$ data bytes, being performed while said validly stored $n_6$ data bytes are retrieved from said fourth read buffer and returned to said second input-output device;

receiving a sixth read signal, a sixth read size and a sixth read address from said second input-output device, said sixth read signal in conjunction with said sixth read size and said sixth read address identifying $n_7$ data bytes to be retrieved and returned to said second input-output device, $n_7$ being equal to at least one;

determining if said $n_7$ data bytes are validly stored in one of said fourth and fifth read buffers, and if said $n_7$ data bytes are not validly stored in one of said first and second read buffers, retrieving a third $m_3$ data bytes comprising said $n_7$ data bytes from said memory storing said retrieved third $m_3$ data bytes into a sixth read buffer and marking said stored third $m_3$ data bytes as valid, $m_3$ being greater than or equal to $n_2$, said valid storage determination being made independent of whether said sixth read address is sequential to said fifth read address; and sending said validly stored $n_7$ data bytes from one of said fourth, fifth, and sixth read buffers to said second input-output device and marking said validly stored $n_7$ data bytes as invalid.

7. The method for asynchronously reading data from a memory, and writing data into said memory, with improved throughput, as set forth in claim 6, wherein said method further comprises the data writing steps of:

receiving a fourth write signal, a fourth write size, and a fourth write address from said second input-output device, said fourth write signal in conjunction with said fourth write size and said fourth write address identifying where in said memory $n_8$ data bytes are to be stored, $n_8$ being equal to at least one;

receiving said $n_8$ data bytes from said second input-output device, storing said $n_8$ data bytes into a fourth write buffer and marking said $n_8$ data bytes as dirty;

determining if one of a plurality of draining conditions is met for said fourth write buffer, and if one of said draining conditions is met, draining at most a first $m_4$ dirty data bytes from said fourth write buffer into said memory and marking said first $m_4$ dirty data bytes as not dirty, said first $m_4$ dirty data bytes comprising said $n_8$ dirty data bytes, $m_4$ being equal to or greater than $n_8$;

receiving a fifth write signal, a fifth write size, and a fifth write address from said second input-output device, said fifth write signal in conjunction with said fifth write size and said fifth write address identifying where in said memory said $n_9$ data bytes are to be stored, $n_9$ being equal to at least one, said fifth write signal, fifth write size, and fifth write address being received independent of whether said fourth write buffer is being drained;

receiving said $n_9$ data bytes from said second input-output device, storing said $n_9$ data bytes into a fifth write buffer and marking said $n_9$ data bytes as dirty, said $n_9$ data bytes being stored and marked dirty independent of whether said fourth write buffer is being drained;

determining if one of said plurality of draining conditions is met for said fifth write buffer, and if one of said draining conditions is met, draining at most a second $m_4$ dirty data bytes from said fifth write buffer into said memory and marking said second $m_4$ dirty data bytes as not dirty, said second $m_4$ dirty data bytes comprising said $n_9$ dirty data bytes, $m_4$ being equal to or greater than $n_9$;

receiving a sixth write signal, a sixth write size, and a sixth write address from said second input-output device, said sixth write signal in conjunction with said sixth write size and said sixth write address identifying where in said memory said $n_{10}$ data bytes are to be stored, $n_{10}$ being equal to at least one, said sixth write signal, sixth write size, and sixth write address being received independent of whether one of said third and fourth write buffers is being drained;

receiving said $n_{10}$ data bytes from said second input-output device, storing said $n_{10}$ data bytes into a sixth write buffer and marking said $n_{10}$ data bytes as dirty, said $n_{10}$ data bytes being stored and marked dirty independent of whether one of said third and fourth write buffers is being drained;

determining if one of said plurality of draining conditions is met for said sixth write buffer, and if one of said draining conditions is met, draining at most a third $m_4$ dirty data bytes from said sixth write buffer into said memory and marking said third $m_4$ dirty data bytes as not dirty, said third $m_4$ dirty data bytes comprising said $n_{10}$ dirty data bytes, $m_4$ being equal to or greater than $n_{10}$.

8. The method for asynchronously reading data from a memory, and writing data into said memory, with improved throughput, as set forth in claim 7, wherein, $m_4$ equals $m_3$;

said fourth, fifth, and sixth read buffers and said fourth, fifth, and sixth write buffers are the same fourth, fifth and sixth buffers respectively; and said data reading steps and said data writing steps are performed for said second input-output device asynchronously.

9. The method for asynchronously reading data from a memory, and writing data into said memory, with improved throughput, as set forth in claim 8, wherein said method further comprises the step of arbitrating any conflict between said data reading steps and said data writing steps performed asynchronously for said first input-output device, and said additional data reading steps and said additional data writing steps performed asynchronously for said second input/output device.

10. The method for asynchronously reading data from a memory, and writing data into said memory, with improved throughput, as set forth in claim 9, wherein said arbitrated asynchronous steps for reading data and steps for writing data for said first and second input-output devices are implemented by a direct memory access controller disposed on a single integrated circuit.

11. A direct memory access controller for asynchronously reading data from a memory, and writing data into said memory, with improved throughput, said direct memory access controller comprising:

first input-output device read interface means coupled to a first input-output device for receiving a first and a second read signal, a first and a second read size and a first and a second read address from said first input-output device, said first and second read signals in conjunction with said first and second read sizes and said first and second read addresses identifying $n_1$ and $n_2$ data bytes to be retrieved and returned to said first input-output device respectively, $n_1$ and $n_2$ being equal to at least one;

first read buffer means coupled to said first input-output device comprising a first plurality of read buffers for storing a first $m_1$ data bytes, conditionally storing a second and a third $m_1$ data bytes, and for sending said $n_1$ and $n_2$ data bytes to said first input-output device, said first $m_1$ data bytes comprising said $n_1$ data bytes, and one of said second and third $m_1$ data bytes comprising said $n_2$ data bytes, $m_1$ being greater than or equal to $n_1$ and $n_2$;

first system bus read interface means coupled to said first plurality of read buffers and said memory for retrieving said first m1 data bytes, conditionally retrieving said second and third $m_1$ data bytes from said memory, and storing said retrieved first, second and third $m_1$ data bytes into a first, a second and a third read buffer of said first plurality of read buffers respectively; and first read buffer control means coupled to said first input-output device read interface means, said first system bus read interface means and said first read buffer means for determining if said second $m_1$ data bytes are to be pre-fetched from said memory, determining if said $n_2$ data bytes are validly stored in one of said first and second read buffers and whether said third $m_1$ data bytes are to be retrieved from said memory, marking said stored first, second and third $m_1$ data bytes as valid, instructing said validly stored $n_1$ and $n_2$ data bytes to be sent from said first read buffer and from one of said first, second and third read buffers to said first input-output device respectively, and marking said validly stored $n_1$ and $n_2$ data bytes as invalid;

said pre-fetching determination being made in a predetermined manner, and said valid storage determination being made independent of whether said second read address is sequential to said first read address;

said pre-fetching determination, pre-fetching, storing, and marking of said second $m_1$ data bytes, being performed while said validly stored $n_1$ data bytes are sent from said first read buffer to said first input-output device;

said valid marking being performed as said $n_1$ and $n_2$ data bytes are stored into said first plurality of read buffers, and said invalid marking being performed as said validly stored $n_1$ and $n_2$ data bytes are sent to said first input/output device.

12. The direct memory access controller for asynchronously reading data from a memory, and writing data into said memory, with improved throughput, as set forth in claim 11, wherein said direct memory access controller further comprises, first input-output device write interface means coupled to said first input/output device for receiving a first, second and third write signals, a first, second and third write sizes, a first, second and third write addresses from said first input/output device, said first, second, and third write signals in conjunction with said first, second, third write sizes and said first, second and third write addresses identifying where in said memory $n_3$, $n_4$, and $n_5$ data bytes are to be stored respectively, $n_3$, $n_4$, and $n_5$ being equal to at least one;

first write buffer means coupled to said first input-output device comprising a first plurality of write buffers for receiving said $n_3$, $n_4$, and $n_5$ data bytes from said first input-output device, and storing said $n_3$, $n_4$, and $n_5$ data bytes into a first write buffer, one of said first and a second write buffers, and one of said first, said second and a third write buffers of said first plurality of write buffers respectively;

first write buffer control means coupled to said first input-output write interface means and said first write buffer means for instructing said first write buffer, one of said first and second write buffers, and one of said first, second and third write buffers of said first plurality of write buffers to store said $n_3$, $n_4$, and $n_5$ data bytes respectively, marking said $n_3$, $n_4$, and $n_5$ data bytes as dirty, determining if at least one of a plurality of draining conditions is met for at least one of said first, second and third write buffers, and if at least one of said draining conditions is met for at least one of said first, second and third write buffers, instructing draining at most a first, second and third $m_2$ dirty data bytes from at least one of said first, second and third write buffers into said memory respectively, and marking at least one of said first, second, and third $m_2$ dirty data bytes as not dirty, said first, second and third $m_2$ dirty data bytes comprising said $n_3$, $n_4$, and $n_5$ dirty data bytes, $m_2$ being equal to or greater than $n_3$, $n_4$, and $n_5$; and first system bus write interface means coupled to said first write buffer means, said first write buffer control means and said memory for conditionally draining said first, second and third $m_2$ dirty data bytes into said memory;

said second and third write signals, second and third write sizes, and second and third write addresses, being received independent of whether said first write buffer, and said first and second write buffers, are being drained respectively;

said $n_4$ and $n_5$ data bytes being received and stored independent of whether said first write buffer, and one of said first and second write buffers, are being drained respectively;

said $n_3$, $n_4$, and $n_5$ data bytes being marked as dirty as they are stored.

13. The direct memory access controller for asynchronously reading data from a memory, and writing data into said memory, with improved throughput, as set forth in claim 12, wherein, $m_2$ equals $m_1$;

said first input-output device read interface means and said first input/output device write interface means are the same first input-output device interface means;

said first plurality of read buffers, and said first plurality or write buffers are the same first plurality of buffers;

said first read buffer control means and said first write buffer control means are the same first buffer control means;

said first system bus read interface means and said first system bus write interface means are the same first system bus interface means; and said data reading and said data writing are performed for said first input/output device asynchronously.

14. The direct memory access controller for asynchronously reading data from a memory, and writing data into said memory, with improved throughput, as set forth in claim 13, wherein, said third buffer is the least recently used of said first and second buffers.

15. The direct memory access controller for asynchronously reading data from a memory, and writing data into said memory, with improved throughput, as set forth in claim 13, wherein said direct memory access controller is disposed on a single integrated circuit.

16. The direct memory access controller for asynchronously reading data from a memory and writing data into said memory, with improved throughput, as set forth in claim 13, wherein said direct memory access controller further comprises:

second input-output device read interface means coupled to a second input-output device for receiving a fifth and sixth read signals, a fifth and sixth read sizes and a fifth and sixth read addresses from said second input-output device, said fifth and sixth read signals in conjunction with said fifth and sixth read sizes and said fifth and sixth read addresses identifying $n_6$ and $n_7$ data bytes to be retrieved and returned to said second input-output device respectively, $n_6$ and $n_7$ being equal to at least one;

second read buffer means comprising a second plurality of read buffers coupled to said second input-output device for storing a first $m_3$ data bytes, conditionally storing a second and third $m_3$ data bytes, and for sending said $n_6$ and $n_7$ data bytes to said second input-output device, said first $m_3$ data bytes comprising said $n_6$ data bytes, and one of said second and third $m_3$ data bytes comprising said $n_7$ data bytes, $m_3$ being greater than or equal to $n_6$ and $n_7$;

second system bus read interface means coupled to said plurality of read buffers and said memory for retrieving said first $m_3$ data bytes, conditionally retrieving said second and third $m_3$ data bytes from said memory, and storing said retrieved first, second and third $m_3$ data bytes into a fourth, fifth and sixth read buffers of said second plurality of read buffers respectively; and second read buffer control means coupled to said second input-output device read interface means, said second system bus read interface means and said second plurality of read buffers for determining if said second $m_3$ data bytes are to be pre-fetched from said memory, determining if said $n_6$ data bytes are validly stored in one of said fourth and fifth read buffers and whether said third $m_3$ data bytes are to be retrieved from said memory, marking said stored first, second and third $m_3$ data bytes as valid, instructing said validly stored $n_6$ and $n_7$ data bytes to be sent from said fourth read buffer and from one of said fourth, fifth and sixth read buffers to said second input-output device respectively, and marking said validly stored $n_6$ and $n_7$ data bytes as invalid;

said pre-fetching determination being made in a predetermined manner, and said valid storage determination being made independent of whether said sixth read address is sequential to said fifth read address;

said pre-fetching determination, pre-fetching, storing, and marking of said second $m_3$ data bytes, being performed while said validly stored $n_6$ data bytes are sent from said fourth read buffer to said second input-output device;

said valid marking being performed as said $n_6$ and $n_7$ data bytes are stored into said second plurality of read buffers, and said invalid marking being performed as said validly stored $n_6$ and $n_7$ data bytes are sent to said second input-output device.

17. The direct memory access controller for asynchronously reading data from a memory, and writing data into said memory, with improved throughput, as set forth in claim 16, wherein said direct memory access controller further comprises:

second input-output device write interface means coupled to said second input-output device for receiving a fourth, fifth, and sixth write signals, fourth, fifth and sixth write sizes, a fourth, fifth and sixth write addresses from said second input-output device, said fourth, fifth, and sixth write signals in conjunction with said fourth, fifth, and sixth write sizes and said fourth, fifth, and sixth write addresses identifying where in said memory $n_8$, $n_9$, and $n_{10}$ data bytes are to be stored respectively, $n_8$, $n_9$, and $n_{10}$ being equal to at least one;

second write buffer means comprising a second plurality of write buffers coupled to said second input-output device for receiving said $n_8$, $n_9$, and $n_{10}$ data bytes from said second input-output device, and storing said $n_8$, $n_9$, and $n_{10}$ data bytes into a fourth write buffer, one of a fourth and fifth write buffers, and one of a fourth, fifth, and sixth write buffers of said second plurality of write buffers respectively;

second write buffer control means coupled to said second input-output write interface means and said second write buffer means for instructing said fourth write buffer, one of said fourth and fifth write buffers, and one of said fourth, fifth and sixth write buffers of said second plurality of write buffers to store said $n_8$, $n_9$, and $n_{10}$ data bytes respectively, marking said $n_8$, $n_9$, and $n_{10}$ data bytes as dirty, determining if at least one of a plurality of draining conditions is met for said fourth, fifth and sixth write buffers, and if at least one of said draining conditions is met for at least one of said fourth, fifth and sixth write buffers, instructing draining at most a first, second and third $m_4$ dirty data bytes from at least one of said fourth, fifth and sixth write buffers into said memory respectively, and marking at least one of said first, second, and third $m_4$ dirty data bytes as not dirty, said first, second and third $m_4$ dirty data bytes comprising said $n_8$, $n_9$, and $n_{10}$ dirty data bytes, $m_4$ being equal to or greater than $n_8$, $n_9$, and $n_{10}$; and second system bus write interface means coupled to said second write buffer means, said second write buffer control means and said memory for conditionally draining said first, second and third $m_4$ dirty data bytes into said memory;

said fifth and sixth write signals, fifth and sixth write sizes, and fifth and sixth write addresses, being received independent of whether said fourth write buffer, and said fourth and fifth write buffers, are being drained respectively;

said $n_9$, and $n_{10}$ data bytes being received and stored independent of whether said fourth write buffer, and one of said fourth and fifth write buffers, are being drained respectively;

said $n_8$, $n_9$, and $n_{10}$ data bytes being marked as dirty as they are stored.

18. The direct memory access controller for asynchronously reading data from a memory, and writing data into said memory, with improved throughput, as set forth in claim 17, wherein, $m_4$ equals $m_3$;

said second input-output device read interface means and said second input-output device write interface means are the same second input-output device interface means;

said second plurality of read buffers, and said second plurality of write buffers are the same second plurality of buffers;

said second read buffer control means and said second write buffer control means are the same second buffer control means;

said second system bus read interface means and said second system bus write interface means are the same second system bus interface means; and said data reading and said data writing are performed for said second input-output device asynchronously.

19. The direct memory access controller for asynchronously reading data from a memory, and writing data into said memory, with improved throughput, as set forth in claim 18, wherein said first and second system bus interface means are the same system bus interface means;

said same system bus interface means comprising an arbitration means coupled to said first and second read/write buffer control means, and said first and second plurality of read/write buffers, for arbitrating any conflict between said data reading and said data writing performed asynchronously for said first and second input-output devices.

20. The direct memory access controller for asynchronously reading data from a memory, and writing data into said memory, with improved throughput, as set forth in claim 19, wherein said direct memory access controller is disposed on a single integrated circuit.

* * * * *

UNITED STATES PATENT AND TRADEMARK OFFICE
CERTIFICATE OF CORRECTION

PATENT NO. : 5,283,883
DATED : February 1, 1994
INVENTOR(S) : Mishler et al.

It is certified that error appears in the above-identified patent and that said Letters Patent is hereby corrected as shown below:

In column 21 at line 15, please delete " or " and insert -- of --.

Signed and Sealed this

Twenty-third Day of June, 1998

Attest:

BRUCE LEHMAN

*Attesting Officer*   *Commissioner of Patents and Trademarks*